US012667954B2

(12) United States Patent (10) Patent No.: US 12,667,954 B2
Morton (45) Date of Patent: Jun. 30, 2026

(54) MAGNETIC TOOL STAND

(71) Applicant: Magswitch Technology Inc., Lafayette, CO (US)

(72) Inventor: David H. Morton, Boulder, CO (US)

(73) Assignee: Magswitch Automation Company, Superior, CO (US)

(*) Notice: Subject to any disclaimer, the term of this patent is extended or adjusted under 35 U.S.C. 154(b) by 0 days.

(21) Appl. No.: 15/324,628

(22) PCT Filed: Jul. 9, 2015

(86) PCT No.: PCT/IB2015/055186
§ 371 (c)(1),
(2) Date: Jan. 6, 2017

(87) PCT Pub. No.: WO2016/005929
PCT Pub. Date: Jan. 14, 2016

(65) Prior Publication Data
US 2017/0232605 A1 Aug. 17, 2017

Related U.S. Application Data

(60) Provisional application No. 62/022,505, filed on Jul. 9, 2014, provisional application No. 62/130,586, filed on Mar. 9, 2015.

(51) Int. Cl.
*B25H 1/00* (2006.01)
*B23Q 9/00* (2006.01)

(52) U.S. Cl.
CPC ......... *B25H 1/0071* (2013.01); *B23Q 9/0042* (2013.01); *Y10T 408/554* (2015.01)

(58) Field of Classification Search
CPC ............ B23B 49/026; B23B 2260/118; B23B 2260/10; B25H 1/0071; Y10T 408/554; B23Q 9/0042

(Continued)

(56) References Cited

U.S. PATENT DOCUMENTS 676,043 A * 6/1901 Lincoln ................ B25H 1/0071
408/137
935,291 A * 9/1909 Boenig ................ B25H 1/0071
269/8

(Continued)

FOREIGN PATENT DOCUMENTS

CN 1568527 1/2005
CN 104668621 6/2015

(Continued)

OTHER PUBLICATIONS

Description JPH10148630A (translation) obtained at https://worldwide.espacenet.com/ (last visited Mar. 10, 2022).*

(Continued)

*Primary Examiner* — Ryan Rufo
(74) *Attorney, Agent, or Firm* — Faegre Drinker Biddle Reath LLP

(57) ABSTRACT

A magnetic base for supporting a tool having a work piece engagement component relative to a ferromagnetic body, comprising: at least two magnet units having a working face, each unit adapted to be magnetically attached to the ferromagnetic body; and a support structure coupled to the at least two magnet units and including a mounting structure adapted to secure the tool to the support structure, the support structure having a window in or a cut-out extending into an about centric location of the support structure such that the work piece engagement component of the tool may extend from a first side of the support structure to engage the ferromagnetic body located proximate a second side of the support structure, the second side being opposite the first side, the at least two magnet units being positionable so that they can fit onto a flat surface or a curved surface.

24 Claims, 17 Drawing Sheets

(58) Field of Classification Search
 IPC ..................................................... B23B 45/14
 See application file for complete search history.

(56) References Cited

U.S. PATENT DOCUMENTS

| | | | | |
|---|---|---|---|---|
| 975,534 | A * | 11/1910 | King | B63C 11/44 |
| | | | | 114/333 |
| 1,010,975 | A * | 12/1911 | Stroner et al. | B25H 1/0071 |
| | | | | 408/712 |
| 2,818,655 | A | 1/1958 | de Gaston | |
| 2,849,900 | A * | 9/1958 | Heidtman, Jr. | B25H 1/0078 |
| | | | | 408/112 |
| 2,879,678 | A | 3/1959 | Kaiser et al. | |
| 3,044,321 | A | 7/1962 | Buck et al. | |
| 3,456,738 | A * | 7/1969 | Harry | B25H 1/0042 |
| | | | | 173/18 |
| 3,540,320 | A * | 11/1970 | Martinmaas | B25H 1/0071 |
| | | | | 408/76 |
| 3,922,107 | A | 11/1975 | Fowler | |
| 4,047,827 | A | 9/1977 | Hougen | |
| 4,055,824 | A * | 10/1977 | Baermann | B23Q 3/152 |
| | | | | 335/295 |
| 4,242,778 | A | 1/1981 | Kay | |
| 4,284,110 | A * | 8/1981 | Divelbiss | B63C 7/006 |
| | | | | 114/50 |
| 4,390,309 | A | 6/1983 | Frangmann | |
| 4,393,363 | A | 7/1983 | Iwasaki | |
| 4,639,170 | A | 1/1987 | Palm | |
| 4,688,975 | A | 8/1987 | Palm | |
| 4,714,865 | A | 12/1987 | Chin et al. | |
| 4,848,546 | A | 7/1989 | McCormick et al. | |
| 4,921,292 | A | 5/1990 | Harwell et al. | |
| 4,995,493 | A | 2/1991 | Cotsman et al. | |
| 5,002,173 | A | 3/1991 | Hucul et al. | |
| 5,125,601 | A | 6/1992 | Monford, Jr. | |
| 5,145,227 | A | 9/1992 | Monford, Jr. | |
| 5,261,150 | A * | 11/1993 | Grube | B23Q 9/0014 |
| | | | | 248/226.11 |
| 5,346,334 | A * | 9/1994 | Einaru | B23Q 9/0014 |
| | | | | 405/262 |
| 5,397,212 | A | 3/1995 | Watanabe et al. | |
| 5,449,211 | A | 9/1995 | Monford, Jr. | |
| 5,462,392 | A * | 10/1995 | Hardwick | B23B 47/287 |
| | | | | 408/110 |
| 5,720,010 | A | 2/1998 | Watanabe et al. | |
| 5,796,229 | A | 8/1998 | Akeel | |
| 5,882,171 | A | 3/1999 | Tinner et al. | |
| 5,984,594 | A * | 11/1999 | Osborne | B23B 47/28 |
| | | | | 408/1 R |
| 5,993,365 | A | 11/1999 | Stagnitto et al. | |
| 6,472,676 | B1 * | 10/2002 | Douglas | G05B 19/401 |
| | | | | 250/208.1 |
| 6,538,544 | B1 | 3/2003 | Hardy | |
| 6,668,466 | B1 | 12/2003 | Bieg et al. | |
| 6,847,181 | B2 | 1/2005 | Brooks et al. | |
| 6,892,465 | B2 | 5/2005 | Raab et al. | |
| 7,012,495 | B2 | 3/2006 | Underwood et al. | |
| 7,049,919 | B2 * | 5/2006 | Yamaki | H01F 7/0294 |
| | | | | 269/8 |
| 7,435,041 | B1 * | 10/2008 | McGill | B25H 1/0064 |
| | | | | 408/110 |
| 7,548,147 | B2 * | 6/2009 | Chiang | H01F 7/0257 |
| | | | | 335/289 |
| 7,587,800 | B2 * | 9/2009 | Dasbach | B66F 15/00 |
| | | | | 335/228 |
| 7,715,946 | B2 | 5/2010 | Watanabe et al. | |
| 8,122,610 | B2 * | 2/2012 | Tait | G01B 21/042 |
| | | | | 33/502 |
| 8,123,015 | B2 | 2/2012 | Yanai et al. | |
| 8,183,965 | B2 | 5/2012 | Michael | |
| 8,186,294 | B2 * | 5/2012 | Baylot | B63C 7/006 |
| | | | | 114/221 A |

| | | | | |
|---|---|---|---|---|
| 8,256,098 | B2 | 9/2012 | Michael | |
| 8,350,663 | B1 | 1/2013 | Michael | |
| 8,390,271 | B2 * | 3/2013 | Cardone | B25B 11/002 |
| | | | | 324/205 |
| 8,544,830 | B2 * | 10/2013 | Sladojevic | B25B 11/002 |
| | | | | 219/205 |
| 8,779,715 | B2 | 7/2014 | Kassow et al. | |
| 8,864,120 | B2 | 10/2014 | Day et al. | |
| 9,242,367 | B2 | 1/2016 | Timmons et al. | |
| 9,452,522 | B2 | 9/2016 | Timmons et al. | |
| 9,453,769 | B2 | 9/2016 | Michael | |
| 10,583,539 | B2 | 3/2020 | Timmons et al. | |
| 2009/0229419 | A1 | 9/2009 | Swanson | |
| 2011/0052654 | A1 | 3/2011 | Wilson et al. | |
| 2011/0248806 | A1 * | 10/2011 | Michael | H01F 7/04 |
| | | | | 335/295 |
| 2013/0320686 | A1 * | 12/2013 | Morton | B66C 1/04 |
| | | | | 294/65.5 |
| 2014/0099802 | A1 | 4/2014 | Hicks et al. | |
| 2014/0237793 | A1 * | 8/2014 | Gamboa | F16B 5/12 |
| | | | | 29/426.2 |
| 2014/0360305 | A1 | 12/2014 | Olds et al. | |
| 2016/0187208 | A1 | 6/2016 | Michael | |
| 2016/0256995 | A1 * | 9/2016 | Albert | B23Q 9/0042 |
| 2016/0289046 | A1 * | 10/2016 | Norton | B66C 1/04 |
| 2017/0239821 | A1 | 8/2017 | Lessing et al. | |
| 2018/0169768 | A1 * | 6/2018 | Albert | B64F 5/10 |

FOREIGN PATENT DOCUMENTS

| | | | | | |
|---|---|---|---|---|---|
| CN | 105538341 | A | | 5/2016 | |
| CN | 205466311 | U | | 8/2016 | |
| EP | 2607029 | | | 6/2013 | |
| FR | 588454 | A | * | 5/1925 | B23Q 11/005 |
| FR | 896945 | A | * | 3/1945 | B23Q 3/1543 |
| GB | 583158 | A | * | 12/1946 | B25H 1/0071 |
| JP | S32-000856 | | | 2/1957 | |
| JP | H10148630 | A | | 6/1998 | |
| JP | 2007301677 | A | * | 11/2007 | |
| JP | 2011006992 | A | * | 1/2011 | |
| JP | 58103310 | | | 11/2015 | |
| KR | 20150145924 | A | | 12/2015 | |
| SU | 831410 | A1 | * | 5/1981 | |
| SU | 1553282 | A1 | * | 3/1990 | |
| WO | WO2003/019583 | | | 3/2003 | |
| WO | WO2012/160262 | | | 11/2012 | |

OTHER PUBLICATIONS

Magswitch MLAY 1000 (spec sheet) obtained at https://magswitch. com/product/mlay1000-lifting-magnet/#tab-downloads (last visited Mar. 11, 2022).*

International Preliminary Report on Patentability dated Nov. 9, 2016 in PCT/IB2015/055186.

International Search Report dated Aug. 19, 2015 in PCT/EB2015/ 055186.

Combined Approaches to Lightweight Arm Utilization, Book et al., Nov. 1985.

The Bracing Strategy for Robot Operation, Book et al., 1984.

Mag-Foot: A steel bridge inspection robot, Intelligent Robots and Systems, 2009, Mazumdar et al.

Design of Magnetic Switchable Device (MSD) and applications in climbing robot, Rochat et al., dated May 18, 2010.

English Translation of Office Action for Japanese Patent Application No. 2017-501267, dated Jan. 23, 2019.

Pro Tool Innovation Awards, "Industry Pros Judge the Innovation Awards", published Jun. 18, 2018, retrieved from https:// protoolinnovationawards.com/about/tool-judges/, 4 pages.

Pro Tool Innovation Awards, "2016 Pro Tool Innovation Corded Tools Awards: PTIA", published Oct. 23, 2017, retrieved from https://protoolinnovationawards.com/winners/2016-pro-tool-innovation-awards/2016-corded-tools/, 15 pages.

* cited by examiner

MAGNETIC TOOL STAND

CROSS-REFERENCE TO RELATED APPLICATION

The present application is a National Stage of International Application No. PCT/IB 2015/055186, filed Jul. 9, 2015, which claims priority to U.S. 62/022,505, filed Jul. 9, 2014and U.S. 62/130,586, filed Mar. 9, 2015, the entire disclosures of which are hereby expressly incorporated herein by reference.

FIELD OF THE INVENTION

The present invention is concerned with tool stands (or bases) which utilise magnets to support and secure a portable tool, such as a power drill, router, grinder and similar, or other weighty instruments or implements, such as non-destructive material and component testing equipment, measuring lasers, etc., on and to a ferromagnetic work piece or support surface, in order to perform operations on the work piece, such as cutting, machining, topography measuring, etc

BACKGROUND TO THE INVENTION

Support stands for portable power tools (and tools with support stands), which use electromagnets or switchable permanent magnet devices for securing the stand (and thus the power tool supported by and/or mounted to it) to a ferromagnetic work piece have been known for many decades.

U.S. Pat. No. 2,818,655 (de Gaston) describes an electromagnetic, squat cylindrical tool holder provided with a central through-hole in which is seated a vertical post. A support arm is cantilevered at the post so it can be displaced radially. An arresting screw is used to secure the relative position of the arm at the post. The cantilevered arm in turn has a mount at one of its free distal ends for a tool.

U.S. Pat. No. 2,879,678 (Kaiser et al.) describes a drill stand with an adjustable and reversible electromagnet base. A holding face (or work piece engagement surface) of the box-like base may be set at any angle with respect to a support column along which a drilling machine mounting and support bracket can be displaced and arrested. The support column is journaled near a lower terminal end thereof to a side wall of the base. The support column can be clamped firmly in a selectable rotational position relative to the holding face (and thus the work piece surface). This permits drilling of bore holes into the work piece at any selected angle. The cantilevered location of the drilling machine with respect to the electromagnet base requires the magnet to be rated sufficiently high to prevent tipping of the drill stand when downward pressure is exerted on the tool during drilling operations. This makes the stand heavy and cumbersome to handle.

U.S. Pat. No. 3,044,321 (Buck et al.) describes an adjustable magnetic drill mount. It has a frame structure with a mount for a drilling machine carried on an electromagnetic base through a set of intermediary, face-abutting slide flanges or plates. In one embodiment, gate slots and pins are present at the flanges which enable relative translational movement in one plane and direction between the base structure (which is secured to one of the slide plates) and the frame structure (which is secured to the other slide plate). A clamping mechanism is used to fix the relative position of the slide flanges to one another in a selected, adjusted translational position. Loosening of the clamping mechanism allows the drilling machine supported at the frame structure (which comprises a traditional vertical post with a vertically adjustable and arrestable support bracket for the drilling machine) to be displaced with respect to the electromagnetic base so as to place a drill bit at a desired location on a work piece.

U.S. Pat. No. 4,639,170 (Palm) describes a magnetic base for portable tools. The magnetic base comprises two superimposed permanent magnet assemblies that can be shifted relative to one another to subtract or reinforce the overall magnetic field made available by the two assemblies in order to secure and release the tool mount from a work piece.

Common to all the aforementioned magnetic bases (also referred to herein as stands) is that they exhibit a planar (or flat) stand surface to magnetically secure the base to a work piece. While this is appropriate for securing the power tool to a flat ferromagnetic work piece, such as a plate or the web of a beam, when the work piece has a curved (convex or concave) surface, additional measures are required to ensure adequate and sufficient magnetic flux transfer from the magnets of the base into the work piece, whilst minimising air gaps which adversely affect the magnetic attraction between stand and work piece.

U.S. Pat. No. 4,047,827 (Hougen) discloses the use of angled accessory support plates for essentially box shaped electromagnetic tool bases. These plates can be secured to the side walls or the bottom face of the housing of the electromagnet, and are adjustable (ie displaceable) so that these can be brought into contact with the surface of a convex shaped work piece (such as a pipe or tank structure). In essence, the angled support plates act as (passive) pole extension members for directing magnetic flux more effectively into the curved-surface work piece.

A more complex, cradle-like pipe adaptor box structure for a magnetic drill base is disclosed in U.S. Pat. No. 4,390,309 (Fangman). It utilises a larger number of more complex shaped ferromagnetic pole extension plates. Ultimately though, this arrangement relies on the same magnetic flux redirection principle as the earlier Hougen patent.

If one looks at the aforementioned prior art magnetic base and tool stand embodiments in their entirety, it will be noted that most base structures support the power tool in a cantilevered fashion. Such arrangement provides a less stable support arrangement, wherein larger and heavier electromagnets or switchable permanent magnet units are required to counter tipping moments encountered during operation of the machining tool when the cutting tool (drill bit, router bit etc) is pressed into the work piece.

Further, in order to be used on curved work pieces such as pipes and tanks, there is a need to attach additional pole extension plates to the base by way of which the base will rest on and provide magnetic flux-conducting paths from the magnetic flux source into the curved surface of such non-flat work pieces.

The problems addressed above apply to both machining tools and other type of implements supported at/carried by a base or stand which utilise magnets to secure a spatial position of the tool/implement vis a vis an object to be machined, measured, joined to another by welding or otherwise, etc. Accordingly, unless the context requires differently, herein below the term 'tool' is used as a generic expression for power machining tools like drills, routers, grinders, measuring implements such as optical and tactile measuring probes and devices, work piece joining or separating devices such as welding or cutting torches, etc.

The present invention seeks to improve the stand or base structure at which the magnetic flux source and the tool are carried.

It is an object of the present invention to provide in at least one of its embodiments a magnetic tool base (or stand) which avoids a cantilevered mounting of the tool at the base.

It is a further object to provide a magnetic base for tools which does not require additional accessories to be mounted to the base's structure for enabling the base to be used on flat as well as curved work pieces or support surfaces, such as pipes, tanks and the like.

In the latter case, it would be particularly advantageous for at least a preferred embodiment of the invention to provide a base or stand that can be reconfigured in simple manner for use on either flat or curved surface work pieces without the need for accessories.

These and further objects, as well as preferred features of the invention, will become apparent in the following description.

SUMMARY OF THE INVENTION

In accordance with one aspect, the present invention provides a magnetic tool stand for supporting and securing a tool relative to a ferromagnetic body, comprising:

a) first and second on-off switchable magnet units, preferably with similar or same magnetic rating, each unit having a source of magnetic flux and at least one pair of oppositely polarisable pole shoes at a working face of the unit, the pole shoes disposed to provide a closed magnetic circuit at each unit with and when contacting a ferromagnetic body and to magnetically attach the unit to the ferromagnetic body;

b) a support structure having a first side on which is provided a mounting structure for releasable or permanent securing of a tool to the support structure, a second side opposite the first side and which is intended, in use of the tool stand, to face a ferromagnetic body on which the tool stand is to be secured, and in a preferred embodiment a window or a cut-out extending between the first and second sides which allows a work piece interaction component of the tool to interact with the ferromagnetic body or a work piece located proximate the second side, whereby the window or the cut-out extending into the support structure is preferably located in or ends at an about centric location of the support structure; and c) first and second mounts releasably securing the first and second magnet units, respectively, to the support structure, the two mounts located in spaced apart relationship to each other, and on opposing sides of the window or the cut-out where such is present, the first and second mounts devised to provide at least one degree of freedom of rotational movement for the respective magnet unit at the support structure and enable the working faces of the magnet units to be rotated into a range of operational positions including a first position in which the working faces of both the magnet units extend in a common plane or parallel planes for resting the pole shoe pairs on at least one planar surface of the ferromagnetic body, and a second position in which the working faces of the first and second magnet units are angled relative to each other for resting the pole shoe pairs of both magnet units on a curved surface of the ferromagnetic body, thus enabling the pole shoe pairs at each magnet unit to provide the closed magnetic circuit with the ferromagnetic body.

In accordance with another aspect, the present invention provides a magnetic base for magnetically securing a tool to a ferromagnetic body, comprising:

a support structure having a first side on which a tool, such as a power tool or an implement such as a measuring device, is removably secured via a mounting structure or otherwise permanently integrated, and a second side opposite the first side;

a pair of on-off switchable magnet units having a working face, each unit rated for magnetically securing the tool or implement to a ferromagnetic body when at least one of the working faces is in contact with it; and a pair of mounts at the support structure in spaced-apart relationship to each other, the mounts devised for (i) securing a respective one of the pair of on-off switchable magnet units to the support structure, (ii) permitting at least one degree of freedom of rotational movement for each magnet unit and (iii) selectively arresting movement of the magnet units, the one degree of freedom of rotational movement being such that the magnet units are individually positionable and arrestable relative to the support structure and a ferromagnetic body proximate the second side of the support structure in various operational positions which include a first operational position characterised by the working faces of both magnet units extending generally co-planar or plane-parallel to one another, thus enabling the support structure to be magnetically retained at one or more planar (flat) surface (s) of the ferromagnetic body, and a second position characterised by the working faces of the two magnet units being angled relative to each other such, thus enabling both magnet units to rest on a curved surface of the ferromagnetic body and magnetically retain the support structure at the ferromagnetic body.

In yet another aspect of the present invention there is provided a power tool with a stand by way of which the tool can be supported on and releasably fixed to a surface of a ferromagnetic body, comprising:

a support structure at which a motor of the tool is releasably mounted or integrated, the motor for impart motion onto a bit or implement of the tool;

a pair of on-off switchable magnet units for delivering an attractive force sufficient for magnetically retaining and fixing the power tool in releasable manner on a ferromagnetic body, each unit having at least one pair of oppositely polarisable pole shoes at a working face of the unit that serves to stand the support structure on a surface of the ferromagnetic body, the pair of pole shoes creating a closed magnetic circuit with the ferromagnetic body in an on state of the magnet units;

a mount for each of the magnet units at the support structure, the mounts arranged for securing the respectively carried magnet unit to the support structure, the mounts located in spaced apart relationship on opposite sides of the support structure, and preferably on opposite sides of a window or cut-out extending between an upper and a lower side (or face) of the support structure, each mount devised to provide at least one degree of freedom of rotational movement for the respective magnet unit secured at the support structure, whereby the working faces of the magnet units can be rotated into a range of operational positions including a first position in which the working faces with the pole shoe pairs of both magnet units are in a common plane or in parallel planes and enable the support structure to be rested on a planar surface of the ferromagnetic body, and a second position in which the working faces of the magnet units are angled with respect to each other and the respective pole shoe pairs of the two magnet units can provide a closed magnetic circuit when both magnet units rest on a single-curvature surface of the ferromagnetic body.

In yet a further aspect of the present invention there is provided a tool stand by way of which a tool can be supported on and releasably fixed to a surface of a ferro-magnetic body, comprising:

a support structure at which the tool is supported or carried;

a pair of on-off switchable magnet units for magnetically securing and fixing the support structure in releasable manner on a ferromagnetic body, each unit having at least one pair of oppositely polarisable pole shoes at a working face of the unit that serves to stand the support structure on a surface of the ferromagnetic body, whereby the pole shoes serve to create a closed magnetic circuit with the ferromagnetic body in an on state of the magnet units; and a respective magnet unit mount for securing the respective magnet unit at the support structure in spaced apart relationship to each other, both mounts devised to provide at least one degree of freedom of rotational movement of the magnet unit at the support structure and optionally one or both mounts devised to provide at least one degree of freedom of translational movement to the relevant magnet unit at the support structure, whilst secured at the support structure, whereby the rotational attitude in space of and linear spacing between the working faces of the pair of magnet units can be varied into a range of operational positions including a first position in which the working faces of the magnet units are coplanar or parallel to one another for these to be able to rest on at least one planar surface of the ferromagnetic body, and a second position in which the working faces with the pole shoe pairs of the magnet units are angled relative to each, thus enabling resting of the support structure via the magnet units on a single-curvature surface of the ferromagnetic body, with the pole shoe pairs of each magnet unit providing a closed magnetic circuit with the ferromagnetic body in an on state of the magnet units.

Advantageously, in all of the aforementioned embodiments, the support structure, and more specifically, the mounts for the switchable magnet units, will have fasteners or other arresting elements or mechanisms for selectively and releasably fixing a selected one of the operational positions of each of the magnet units at the support structure.

It will be apparent to the skilled addressee that the support structure can be a separate component (ie a tool accessory) on which an otherwise separately fully operational tool can be removably mounted, as is the case eg with stands that allow removable mounting of a hand power drill for vertical-motion controlled plunge drilling. On the other hand, the stand can be made 'integral' part of the tool, as would be the case eg with variable speed plunge routers, where the tool as a whole comprises a motor, a router chuck coupled to the motor, exchangeable bits that can be mounted to the chuck, a work piece engagement plate, and two parallel vertical support columns fixed to the upper face of the plate and on which the motor and chuck are mounted for controlled to and fro movement vis a vis the plate (and thus the work piece on which the plate rests). In other words, the invention is not limited to one or the other of these applications.

As noted, depending on what is intended to be the implement/tool and its components, the support structure according to the invention, with its mounts for securing the on-off switchable magnet devices in a manner allowing certain degrees of freedom of movement, as explained in more detail below, may be a separate accessory for releasably mounting a tool that is an otherwise complete functional entity, the accessory providing the means by which the tool can be magnetically secured to the ferromagnetic body when desired to use the support structure as a stand. It can equally be integral part of the tool without which the functionality of the tool is impaired or intended operation of the tool is not possible, as eg is the case with plunge drills or routers.

In a preferred embodiment, the base will have two magnet units and the support structure will have two mounts only. It will be appreciated that by arranging the two magnet units, each having a pair of pole shoes at the working face of the units, for magnetically securing such unit to a ferromagnetic body, on opposite sides of the support structure, and in particular at opposite borders of the preferably central window (or cut-out), through which the work-piece engagement element of the tool may reach the work piece, an overall more stable and secure stand can be achieved.

Further, by using a gantry-type tool mounting structure, which is secured to or forms integral part of the support structure above the window or cut-out, in accordance with a preferred embodiment of the invention, additional advantages are achieved.

Such gantry-type mounting structure may comprise a tool mount carried on one or more side support uprights or poles, located either side of the window/cut-out, so as to span over said window or cut-out in the support structure. Preferably, the tool mount is secured for translatory movement up and down along said side support uprights and can be arrested at defined positions over said window/cut-out. This arrangement ensures that cantilever moments as are experienced with most prior art magnetic mounts are substantially reduced or avoided all together, given that there is no eccentric mounting of the tool on the magnetic stand, and when downward force is applied onto the tool during a machining (or other) operation, such force will equally not cause undesired moments that would tend to pry-off the magnetic base from the work piece. It is thus preferred that the support structure of the base has a footprint which contains within it the foot print of the tool mounted to the base.

The above constructional/lay-out features in accordance with the invention also enable the selection of smaller rated magnet units vis a vis prior art magnetic tool bases with cantilevered tool mounts of comparable operating specifications. The central location of the tool above the window/cut-out in the support structure means that the magnets will not require to counter substantial cantilever moments present in prior art magnetic bases when machining a work piece during which downward pressure is excreted on the tool carried by the base. Consequently, smaller (lesser) rated magnets can be used without sacrificing holding force, thus making the entire stand lighter than comparable prior art magnetic bases.

Furthermore, by mounting the magnet units to the support structure in a manner that allows the working (or engagement) face of the units (at which the pole shoes are present) to be reoriented, by rotation and optional translatory displacement of one or both units, one dispenses with the need for accessory plates and similar constructs.

In their simplest incarnation, the mounts are cradle mounts whereby the magnet units will be secured to the support structure so that these are respectively rotatable about a respective swivel axis extending between opposite webs or legs of the support structure. A 'cradle-type' mount provides one degree of freedom for rotational movement which will ensure that the magnet units can be re-oriented about a single swivel axis, thereby enabling the pole shoes of both units to be bought into closer conformity with curved work pieces.

While a gimbal mount could also be provided for the magnet units at the support structure, to increase the degrees of freedom of movement of the magnet units at the support structure, use of curvilinear or inclined slots which allow not only translatory but also the one degree of freedom of rotational movement about the swivel axis of each magnet unit will suffice for most applications of magnetic bases (stands) for tools.

As noted above, when speaking about tools or implements, the term is not used in this specification to refer exclusively to electrically (either battery or mains power), pneumatically, hydraulically or otherwise driven power tools employed in work piece machining operations, such as drills, routers, grinders, etc. The term is rather used more expansively, eg in the context of measuring tools that require a probe to (physical or optical) measure a work piece surface, and other tools and implements that are to be secured against movement during a machining or measuring operation on a ferromagnetic work piece or a separate ferromagnetic support surface.

In accordance with a preferred embodiment, at least one of the mounts for the magnet units at the support structure, but preferably both, are further devised to allow relative translatory displacement of the magnet units towards and away from each other on ether side of the window. The translatory displacement can be rectilinear, curved, or both. As noted previously, this increases the freedom of adjustment of the magnet units to allow increased conformity of the magnetic tool base at a ferromagnetic object, be the latter the work piece to be machined or otherwise worked on, or a separate ferromagnetic body.

In an advantageous embodiment, the support structure will comprises a top plate and at least one pair of leg plates extending parallel spaced apart from one another and perpendicular from the top plate, preferably at the width-ward ends of the top plate, whereby the magnet units will then be located and supported between the leg plates on either side of the window or cut-out. The support structure may be of unitary nature, eg a cast body, or assembled from multiple plate elements, e.g. by welding, into a unitary support platform, or otherwise assembled from individual components secured to each other using bolts or other fastening elements.

A good degree of control of movement and stability of the magnet units at the support structure can be achieved by devising the mount for each magnet unit to comprise (a) a pair of congruent slots, one slot in each opposing leg plate in mirrored locations, and (b) a pair of support bolts or pins secured at axially opposite end faces of the respective magnet unit and received within said congruent slots in a manner allowing (i) rotation of the respective magnet unit about a swivel axis extending between the support bolts or pins received in the congruent slots as well as (ii) translatory displacement along said slots, wherein the congruent slots could be rectilinear and extend either parallel to a plane comprising the top plate (of the support structure) or inclined with respect to the plane. This arrangement/lay-out will also allow one and the same magnet base to be used to magnetically secure and support a tool at cylindrical work pieces of varying diameters, the length of the slots providing a primary diameter adjustment range, whereas the engagement angle of the magnet units against a curved surface of a tubular or cylindrical work piece will be primarily a function of spacing and cross-section of the pole shoes at the working face of the magnet units as these come into engagement with said surface as consequence of rotation of the units about their respective swivel axes.

A simplified embodiment of a magnetic tool base in accordance with the present invention is one in which the mount for each magnet unit comprises (a) a pair of through holes located coaxially in the opposing leg plates and (b) a pair of support bolts or pins secured at axially opposite end faces of the respective magnet unit and received within said through holes in a manner allowing rotation of the respective magnet unit about a swivel axis defined by the pair of coaxially aligned through holes (without providing the additional translatory freedom of movement present in the previously described embodiment). A greater degree of control of rotation and support of the magnet units at the support structure can be achieved by the mounts having (a) a pair of mirror-imaged curved slots in the leg plates, the curved slots having as their respective centre of curvature the swivel axis of the respective magnet unit, and (b) a pair of follower pins or bolts secured at the axially opposite end faces of the magnet unit and received in said curved slots in a manner which provides a gated guide for rotation of the magnet unit about its swivel axis.

Advantageously, and in order to increase safety when the magnetic tool base is magnetically secured to a ferromagnetic work piece (or other support body), the base will include an arresting mechanism operative between the magnet units and the support structure to releasably secure the magnet units against movement when in its operational positions in which the units abut with both their pole shoes (which preferably are pole rails having a trapezoidal cross-section) onto the flat or curvilinear surface of the ferromagnetic body (which could be the work piece itself). In a particularly preferred form, the arresting mechanism will comprise a clamping arrangement operable by a handle, in particular one in which clamping is effected using the support or the follower bolts, as the case may be, wherein arresting of movement of the magnet units is effected by frictional engagement of a head portion of said support or follower bolts against the leg plates.

In another aspect of the present invention, the magnet units comprise permanent magnets that can be switched mechanically between a magnetic flux delivering (ie activated or on) state and an off state in which no or only minimal attractive forces will be generated at the pole shoes.

In a particularly preferred embodiment, the magnet units may comprise: (a) a substantially box-like hexahedral external housing with trapezoidal, in particular rectangular axial end faces at which the magnet units are supported to the support structure, (b) at least one pair of stacked, diametrically polarised cylindrical permanent magnets, each pair received within a cylindrical cavity within the housing, wherein the cylindrical permanent magnets are held in the cavity to allow relative rotation of the magnets with respect to one another such that respective north and south poles of the magnets can be cycled through operational positions including an 'on' position in which the north poles and south poles of both magnets coincide, the magnetic fields of both magnets are oriented in the same direction and magnetic flux passes from the magnets through side walls of the housing into the pole shoes, and an 'off' position in which the north and south poles of the stacked magnets oppose one another and the magnetic fields of the stacked magnets are oriented opposite to one another and substantially no magnetic flux is present at the pole shoes, and means for effecting said relative rotation and optionally secure the magnets in one of said operational positions.re is provided.

In a preferred embodiment, the magnet units each comprise at least three pairs of stacked, diametrically polarised cylindrical permanent magnets, each pair received within a respective cylindrical cavity within the housing, said cavities being separated from one another by a web comprising a diamagnetic separation zone, and wherein the housing comprises opposite side walls that provide passive magnetic material pole extensions for the stacked magnet pairs and which comprise mounting means for exchangeable securing a respective one of the pole shoes to a respective one of the side walls at the work piece engagement face of the magnet unit.

Such type of switchable, permanent magnet units can be sourced from Magswitch Technology Inc, Colorado, USA. Magswitch 'Magsquare' and 'MLAY' branded units with different specifications as regards max. break-away force (or holding force), magnetic saturation depths, housing foot print, etc. The principles of construction and operation of such Magswitch-branded switchable permanent magnet units are described in U.S. Pat. Nos. 6,707,360 and 7,012, 495, the contents of which is specifically cross-referenced herein and incorporated by way of short hand cross-reference.

Furthermore, for applications requiring increased holding force and reduced magnetic field penetration depth into a work piece of limited thickness, such as thin-walled tubes, plates and the like, switchable permanent magnet units comprising a number of discrete magnet units arranged in a (linear) array, such as distributed by Magswitch under the designations MLAY aaaXz, and which are also illustrated in the applicant's international patent application PCT/IB2013/001102 (published as WO 2013/179126 A1) can be employed as the magnet units of the magnetic tool base of the present invention. The contents of said WO-document, in so far as relevant in describing a magnet unit with multiple cylindrical, diametrically polarised permanent magnets that can be switched into magnetic field shunting and flux delivering states, and which are received in a box-like housing with a pair of rail-like pole shoes that provide the work piece engagement component of the unit, is specifically incorporated herein by way of short-hand cross-reference.

Further preferred features of the invention will become apparent from the following illustrative description of a preferred embodiment of the present invention, provided with reference to the accompanying drawings.

DESCRIPTION OF PREFERRED EMBODIMENT

Figure 1:
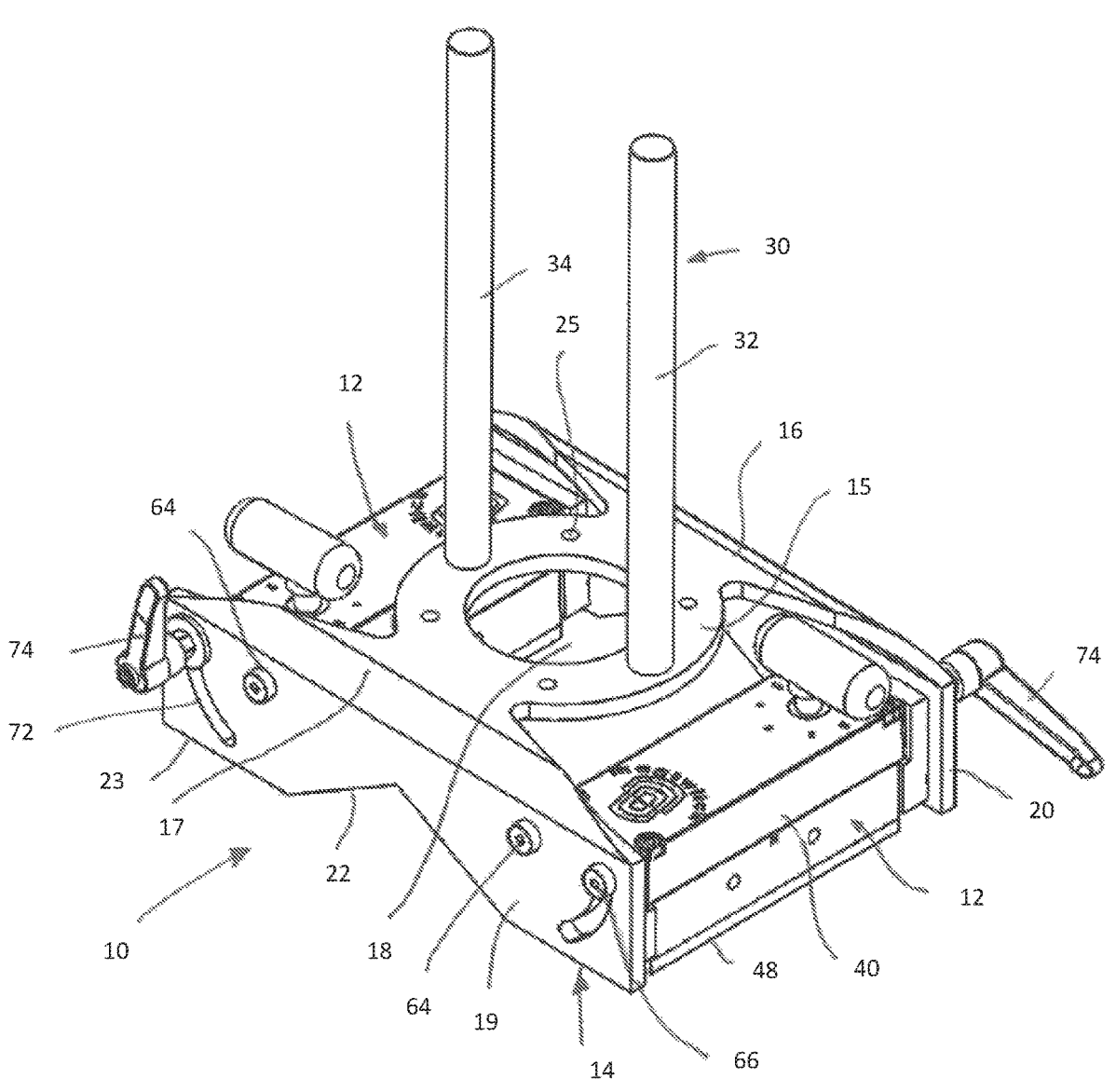
FIG. 1 is an isometric view of a first embodiment of a magnet base in accordance with the invention.

The skilled reader will immediately appreciate from the attached drawings that the different embodiments of a magnetic base or stand 10, 110, 210, 310, 410 in accordance with the present invention share a number of features and similarities in that in each case base 10, 110, 210, 310, 410 comprises a pair of magnet units 12, 312 of identical construction and rating (as described below). These magnet units 12 are mounted/secured to a support structure 14 (FIG. 1-7), 114 (FIG. 8-10), 214 (FIG. 11), 314 (FIGS. 12 and 13) and 414 (FIG. 14) which in turn is provided with means for securing to it or otherwise integrating into it a tool attachment or mounting structure 30, 130, 330 to it, for securing a power or other tool to base 10, 110, 210, 310, 410.

As can best be seen by comparing FIGS. 1, 8, 10, 11, and 12, the tool mounting structure 30, 130. 330 may be embodied in different ways, as will be explained below. Consequently, same reference numerals (and reference numerals in increments of 100) are used in the different figures to denote constructional or functional equivalent features common to all embodiments.

Equally, it will be appreciated that the use of spatial terms and reference plane/axis terms such as 'upper', 'lower', 'longitudinal', 'traverse', 'width-ward' etc are intended solely to facilitate understanding of the make-up and lay-out of the magnetic base 10 and its parts and components and relationship to one another, rather than denoting essential aspects, unless context requires otherwise.

The magnet units 12 (see FIG. 5) preferentially employed in the present invention are manually switchable permanent magnet blocks, such as manufactured by Magswitch Technology Inc. under the product code MLAY series. These units 12 comprise an arrangement of permanent magnets received within a box-like, hexahedral external housing 40. In the embodiments shown in FIGS. 1 to 11, the magnet units are MLAY 1000×3 type, with three pairs of stacked, diametrically polarised cylindrical permanent magnets, each pair received within a respective, upright cylindrical cavity within a lower housing part 41, said cavities being separated from one another by a web comprising a diamagnetic separation zone. The cylindrical permanent magnet pairs are received in the cavities to allow relative rotation of the upper magnet of each pair such that respective north and south poles of the magnets can be cycled through different operational positions. These positions include an 'on' position in which the north poles and south poles of both magnets of each pair coincide and the magnetic fields of both magnets are oriented in the same direction such that magnetic flux can flow from the magnets into opposite longitudinal side walls 42a and 42b of housing 40 and from there into a pair of pole extension rails 48a, 48b which are mounted in parallel-spaced apart relationship in replaceable manner to a lower working face 46 of housing 40 and extend between the axial end (or terminal) faces 44 of housing 40. These positions also include an 'off' position in which the north and south poles of the stacked magnets in each pair oppose one another and the magnetic fields of the stacked magnets are oriented opposite to one another and substantially no magnetic flux is present at the pole extension rails 48, also referred to as pole shoes in the field of magnetics.

Figure 5:
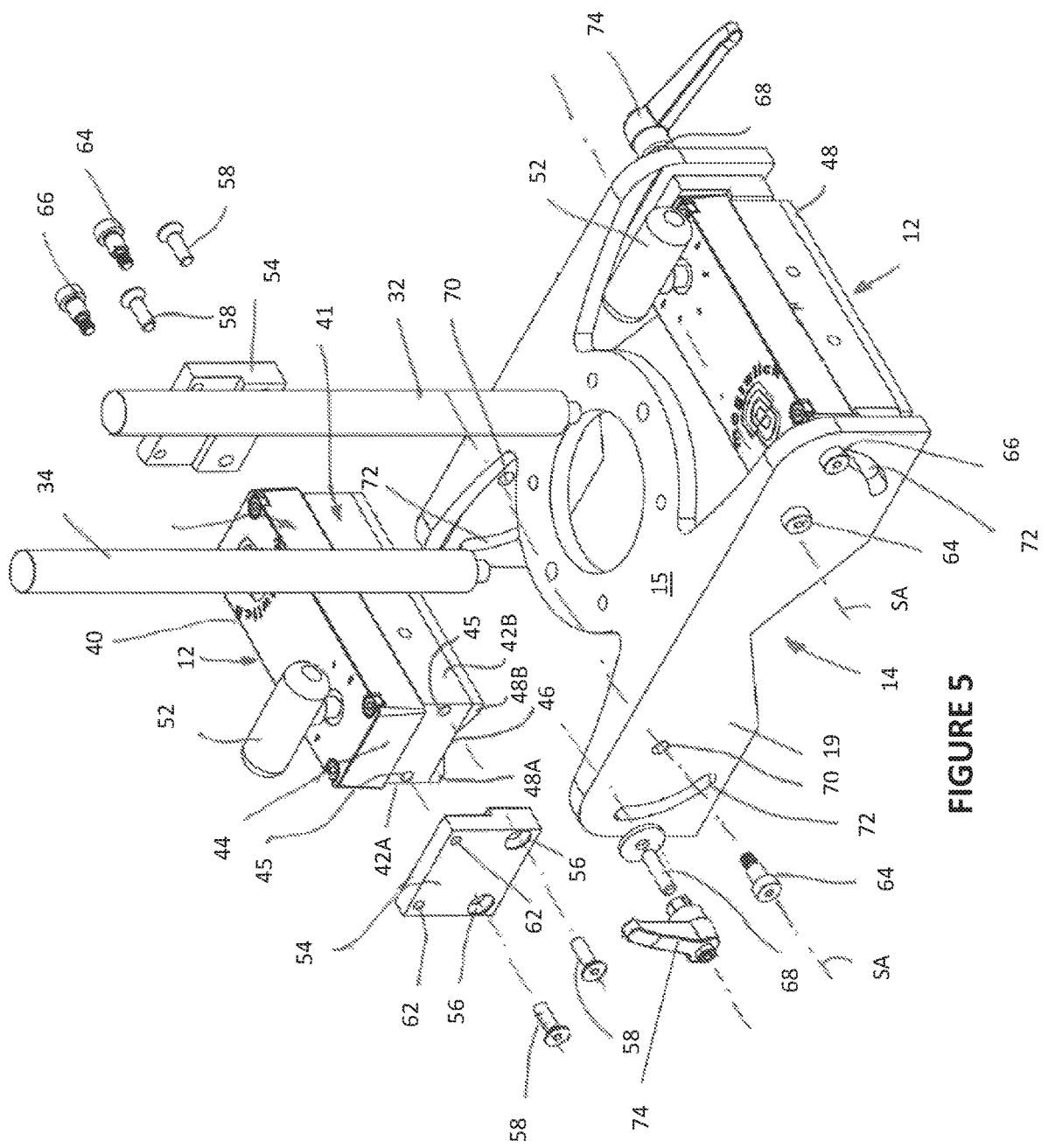
FIG. 5 is a partially exploded view of the magnet base of FIG. 1.

From FIG. 5 it will also be gleaned that an upper housing part 50 of units 12 houses a non-illustrated drive train by way of which the movable magnets of the three pairs of magnets can be synchronously switched between the on and off states, a handle 52 mounted to an upper side of housing 40 serving to effect manual switching of units 12 into the active and deactivated magnetic states. For further details of the principle of operation, lay-out and make up of such MLAY magnet units 12, see patent document WO 2013/179126 A1 the contents of which is incorporated herein by way of cross-reference.

The switchable magnet units could alternatively be of a design such as described and illustrated in patent document WO 2015/071878 in the name of Magswitch Technology Inc., the contents of which is incorporated herein by way of cross-reference.

Figure 2:
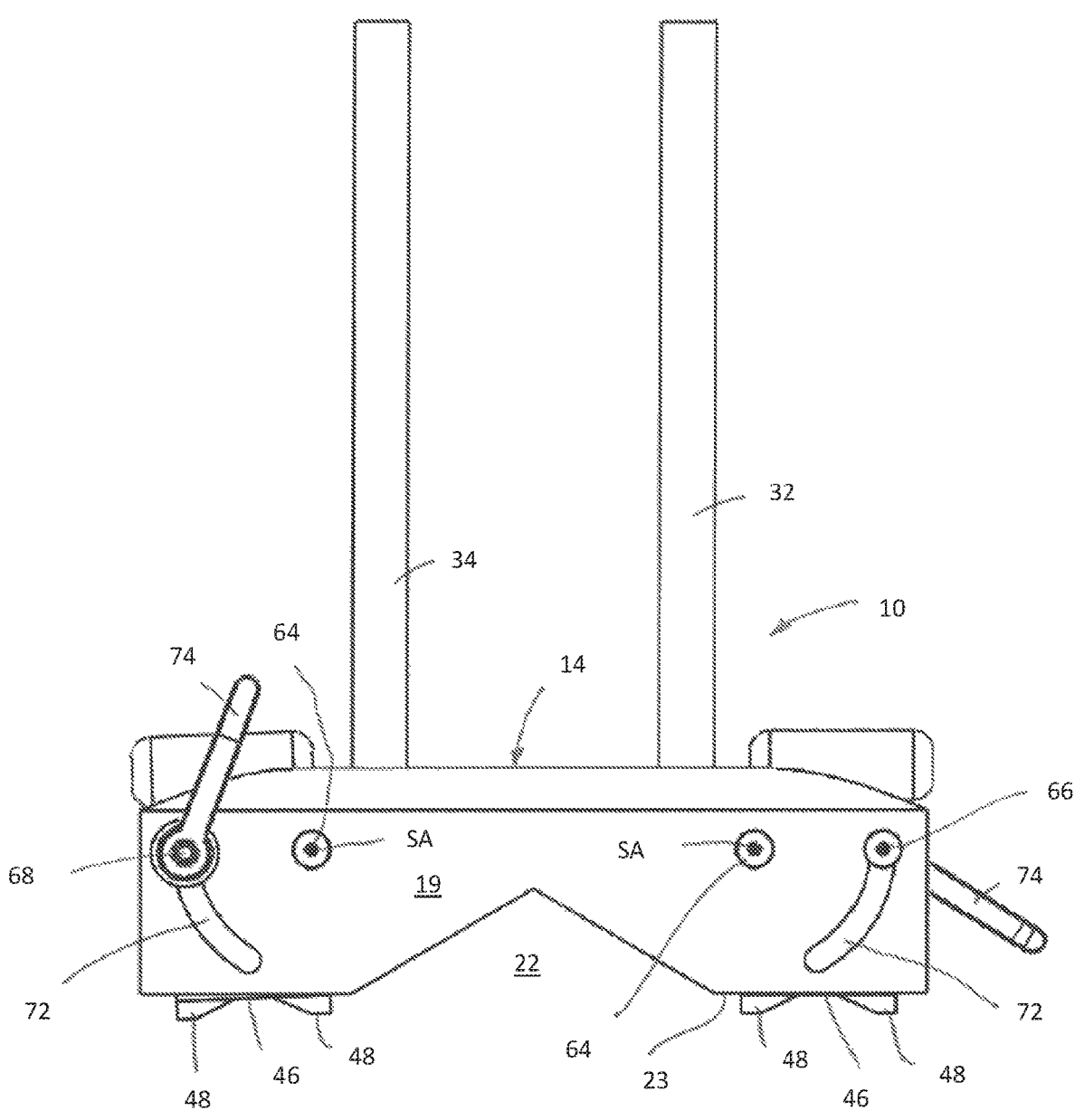
FIG. 2 is a front elevation of the magnet base of FIG. 1.
Figure 3:
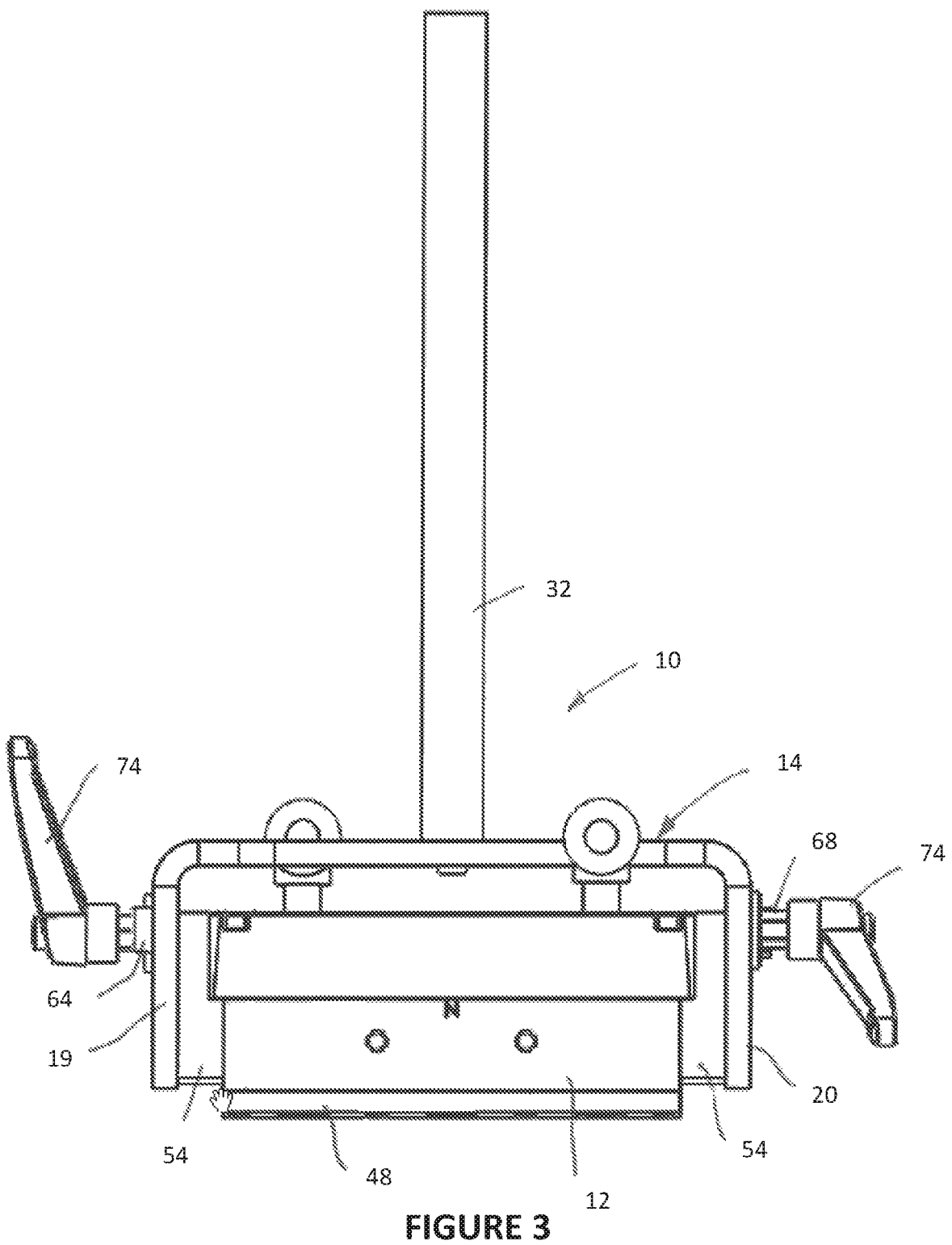
FIG. 3 is a side elevation of the magnet base of FIG. 1.

Turning then to the first base (stand) embodiment illustrated in FIGS. 1 to 7, and in particular FIGS. 1 to 5, magnetic base 10 comprises a support structure 14 of preferably unitary construction, provided either by a cast, non-magnetic metal body or a stamped/forged metal plate bent to shape, in each case exhibiting a substantially u-shape cross section as best seen in FIG. 3. Support structure 14 comprises a top plate 15 of annular configuration having downwardly curving triangular web portions 16, 17 extending radially outwards at diametrically opposite sides of top plate 15, which in turn connect with (ie lead into) respective leg plates 19, 20 which extend perpendicular to the plane in which annular top plate 15 extends. A triangular cut out 22 is provided about centrally at the terminal free lower edge 23 of each leg plate 18 and 20.

Figure 7A:
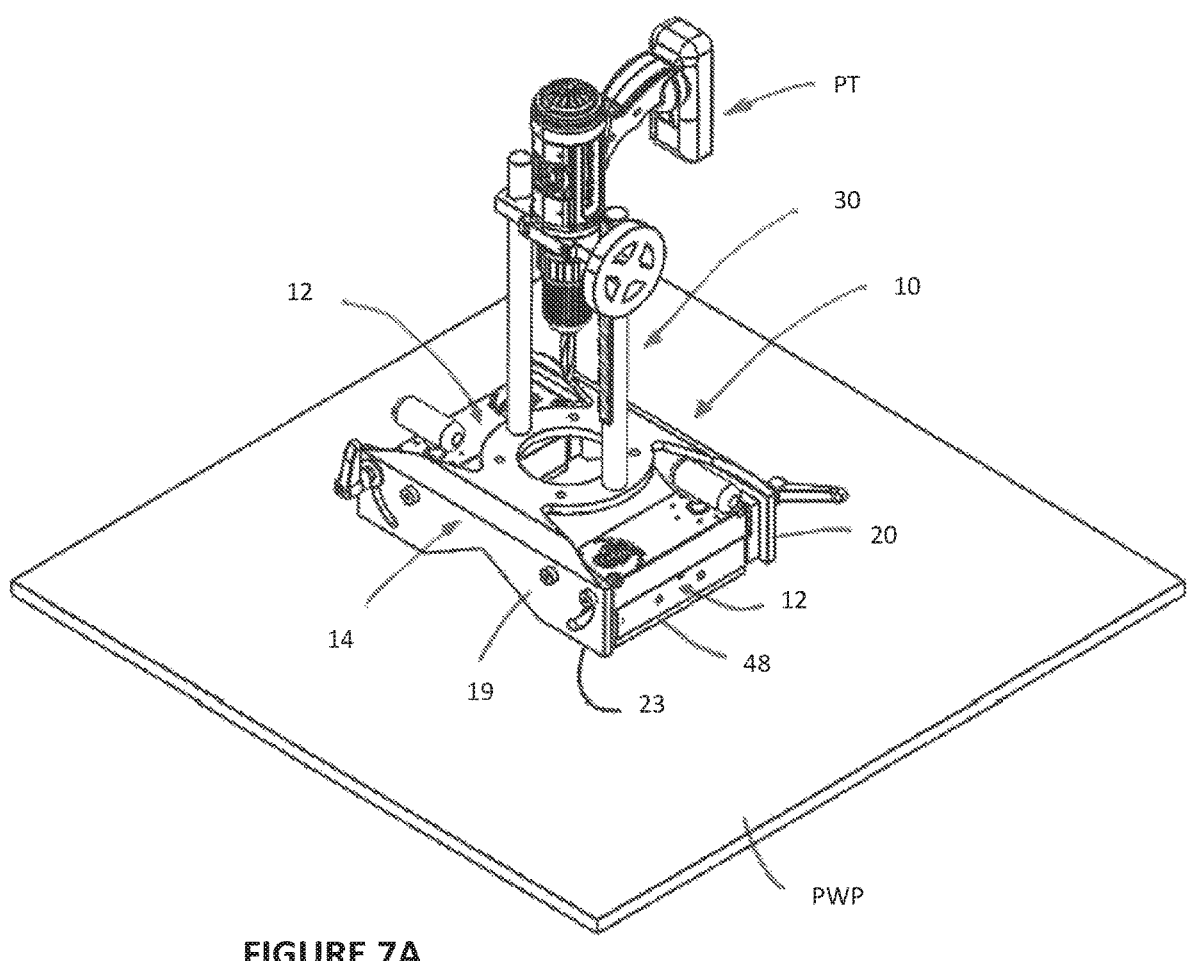
FIGS. 7a and 7b are further isometric views of the magnet base of FIG. 1, magnetically attached to a sheet material work piece and a tubular ferromagnetic work piece, respectively.
Figure 7B:
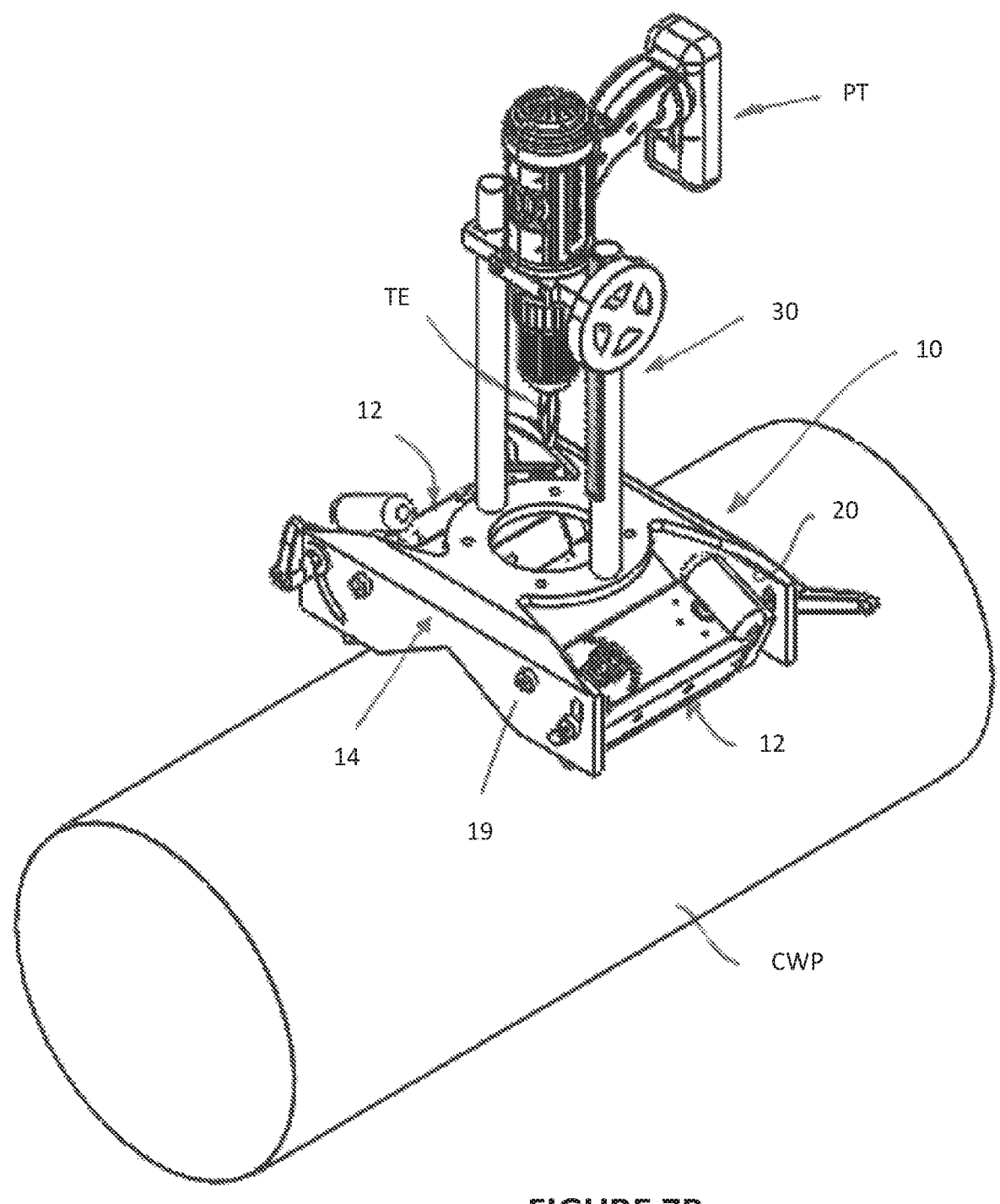

From FIG. 7a can be seen that in use of the magnetic base 10 (as will be explained below), support/stand base 10 can be rested by its leg plates 19, 20 on a flat (ie planar or planiform) ferromagnetic sheet metal work piece PWP, whereas triangular cut-outs 22 (which may be curved as seen in the magnetic base embodiment of FIGS. 11a to 11d) will serve to provide a clearance gap between lower edge 23 of leg plates 19, 20 and the curved outer surface of a curved work piece CWP, such as a steel pipe, when base 10 is magnetically attached to it, as can be seen in FIG. 7b.

Annular top plate 15 provides a central circular window 18 at the support structure 14 which will allow a tool element TE (see eg FIG. 6, 7) to pass from a first (upper) face of top plate 14 to an opposite (lower) face thereof when a power tool PT (or other piece of equipment carried at the support structure 14) is mounted to base 10.

It will be further noted that top plate 15 comprises a plurality of mounting holes 25 evenly spaced about the annular top plate 15. Mounting holes 25 serve to secure/fix a tool mounting structure 30 (as per the embodiment of FIGS. 1-7) to support structure 14 by way of bolts and nuts (not shown). In FIGS. 1-5 are illustrated only one pair of support rods 32, 34 which form part of the tool mounting structure 30 shown in and briefly described with reference to FIGS. 6 and 7.

Figure 4:
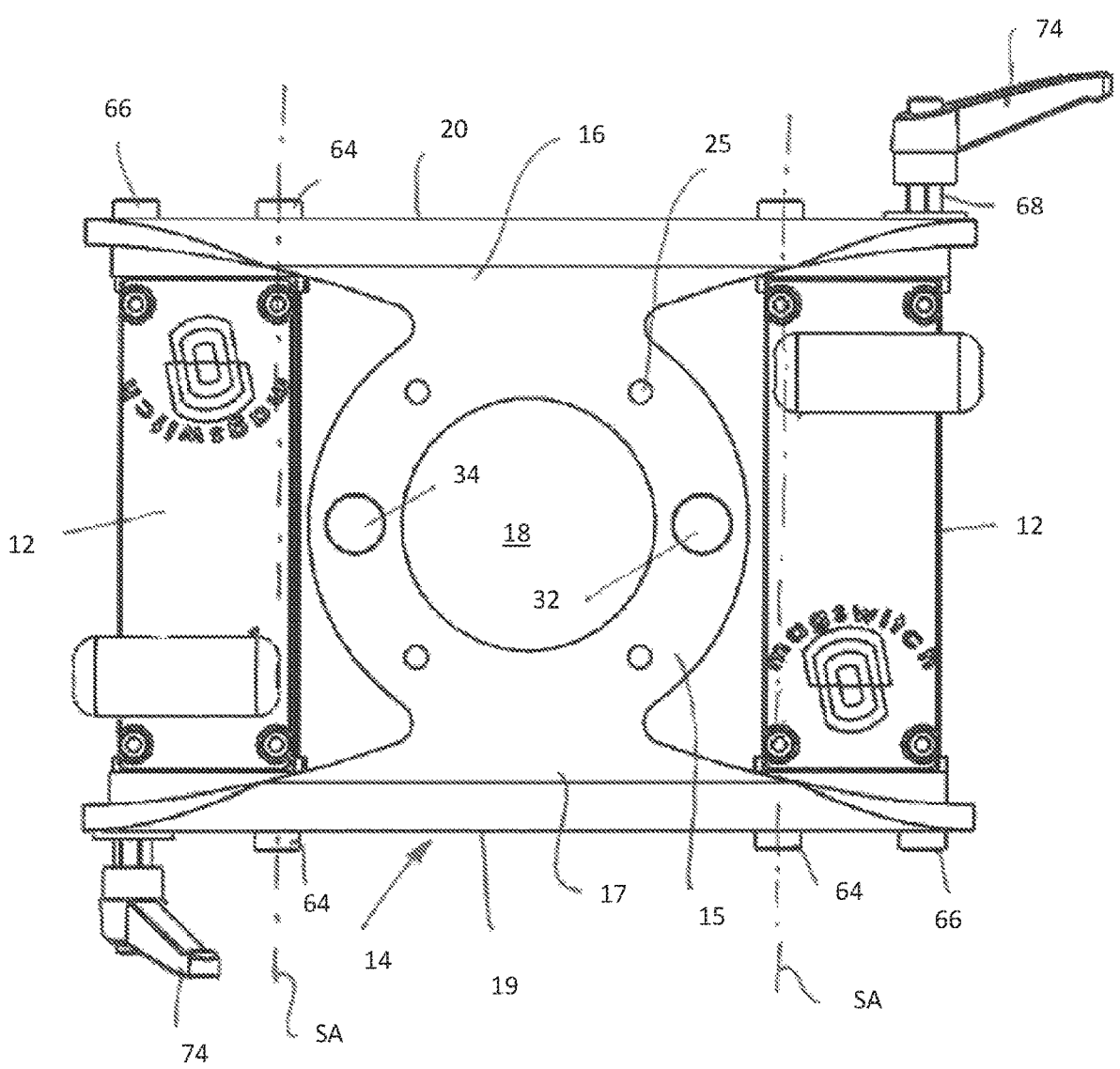
FIG. 4 is a top plan view of the magnet base of FIG. 1.

Referring next in particular to FIGS. 4 and 5, it will be seen that the two magnet units 12 are located on either side of window 18 between the facing leg plates 19, 20, and are supported at legs 19, 20 in a manner allowing units 12 a single degree of freedom of rotation (but no translatory degree of movement) about respective swivel axes SA.

To this end, each unit 12 is provided at both its terminal axial end faces 44 (which are rectangular in plan view but have a stepped surface) with respective, identical mounting plates 54 having one face that conforms with the stepped terminal surface 44 of housing 40 of units 12, and an opposite face that is entirely flat. Countersunk through bores 56 are provided near the lower terminal edge at the two lower corners of mounting plates 54 through which extend respective shoulder bolts 58 that engage in respective threaded bores 45 near the lower corners of end faces 44 of magnet unit housing 40 to secure mounting plates 54 to units 12. Mounting plates 54 further have near each upper corner a threaded bore 62, which serve to receive and fix a support and axle bolt 64 and a guiding bolt 66 (or a guiding pin 68, see below), respectively.

For each magnet unit 12, two support and axle bolts 64 are inserted and extend through cooperating, pair-wise co-axial through holes 70 in both the parallel spaced apart leg plates 19, 20, a total of four being provided, one each at opposite longitudinal locations of the leg plates 19, 20. The diameters of the shafts of axle bolts 64 and through holes 70 are chosen to provide a glide fit such that when the respective axle bolts 64 are securely threaded into the cooperating respective threaded bores 62 of mounting plates 54, the magnet units 12 remain free to rotate about the swivel axis SA defined by these cooperating elements whilst being securely supported between leg plates 19, 20. In essence, such mount could be adequately described as a single axis 'cradle' mount or a single axis gimbal mount (noting that a 'true gimbal' comprises a mount with two axis of rotation that are perpendicular to one another and mutually perpendicular to an axle (of rotation) of a body supported for rotation at such true gimbal) by way of which units 12 are secured to support structure 14 allowing one degree of freedom of rotation only.

It will be further noted that for each magnet unit 12, there are provided one guiding bolt 66 and one guiding pin 68 which are respectively inserted and extend through cooperating, pair-wise mirror image curved guiding slots 72 in both the parallel spaced apart leg plates 19, 20, a total of four being provided, one each near each of the longitudinal ends of both the leg plates 19, 20. The trajectories and centres of (arc) curvature of curved slots 72 are related to the location of through holes 70 (rather: the swivel axis SA), and the length, starting and end points of the curved slots 72 will limit and determine the extent of rotational movement which magnet units 12 are able to carry out at support structure 14. The rotational movement allowed will also determine the extent of re-orientation which the bottom working face 58 of housing 40 of magnet unit 12 will undergo during said rotation between respective end orientations.

As may perhaps be best appreciated from FIG. 2, the upper end of each guiding slot 72 will advantageously be in a line that connects it with the swivel axis SA (ie the axis of neighbouring axle bolt 64) and which line runs parallel with the lower edge 23 of leg plates 19, 20. In such case, one end (stop) position of rotation of units 12 at support structure 14 is characterised by the working face 46 of units 12, at which are mounted in removable manner the pair of parallel spaced apart pole shoes 48 (which have a trapezoidal cross-section thereby defining a flat-concave zone between these two work piece engagement elements of the magnet units 12), to be oriented parallel with a support (or standing) plane encompassing the lower edges 23 of both leg plates 19, 20 of support structure 14. If the arc length is then 60 degrees, for example, this then dictates the other end orientation of the working faces 46 of units 12 to be 60 degrees inclined with respect to the support plane.

It will be appreciated that the diameters of the shafts of guide bolts 66 and guide pins 68 are chosen to provide a loose glide fit when received in guide slots 72. Furthermore, as may be seen in FIG. 5, for example, the guide pins 68 of each magnet unit 12 are devised to cooperate with a female threaded clamping or arresting handle 74 by way of which the spatial orientation of each magnet unit working face 46 can be releasably secured against further movement in any position while pin 68 travels along the arched pathway provided by guiding slots 72. To this end, clamping handle 74 engages the terminal, threaded free end of guide pin 68, with an intermediary washer located between handle 74 and the outer face of leg plates 19, 20, and can be tightened to clamp the washer frictionally against leg plate 19, 20 or untightened to release.

The thus described mounts of the magnet units 12 at support structure 14 allow the magnet units 12 to attain different rotational (operational) positions whereby the magnetic base 10 can be deployed to attach with all pole shoes 48 of both units 12 to engage with a plate-like ferromagnetic work piece PWP, as is schematically illustrated in FIG. 7a, and magnetically secured to it against displacement. The mounts also enable (re-)deployment of base 10 to engage and magnetically attach onto the curved exterior surface of a cylindrical pipe CWP with the two pole shoes 48 of both units 12 touching the work piece by virtue of the units 12 swivelling into a position which allows such engagement.

Figure 6:
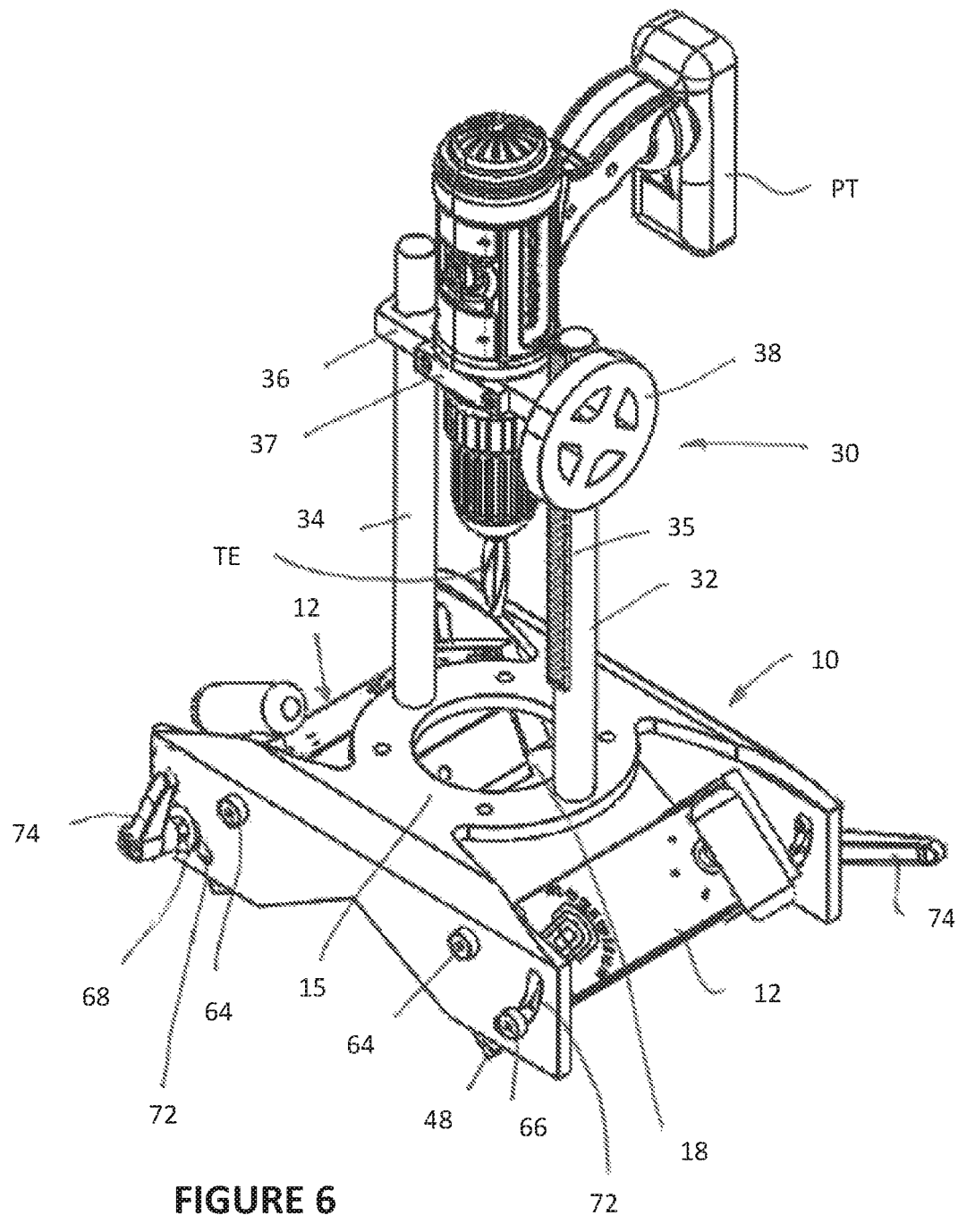
FIG. 6 is a further isometric view of the magnet base of FIG. 1 but with a power tool mounting structure assembled to the base for securing a hand held power drill to the mounting structure.

Turning next to FIG. 6, it shows one embodiment of a tool mounting structure 30 fixed to the top plate 15 of support structure 14 of magnetic tool base 10. Two parallel upright posts 31, 34 having lower terminal ends provided with threaded mounting bolts that extend through mounting holes 25 of top plate 15 are fastened to support structure 14 using suitable nuts (not shown). Alternatively, mounting holes 25 may themselves be threaded.

Post 32 carries a fixed toothed rail 35 which extends part way along the axial extension of post 32. Posts 32 and 34 form part of a gantry-type mount for power tool PT, and serve to support in displaceable manner a tool mounting bracket 36 of generally plate-like configuration having two cylindrical through holes through which posts 32, 34 extend, and a central cut out (not shown) through which the front end of power tool PT may be passed to point towards central window 18 of support structure 14. Power tool PT is immobilised against displacement and secured to gantry plate 36 by means of a clamping brace 37 that can be screwed to plate 36 using bolts. Finally, gantry plate 36 also serves to mount a pinion wheel (not shown) which meshes with toothed rail 35 to provide a rack and pinion drive for controlled back and forth translatory movement of gantry plate 36 along posts 32, 34 upon turning of handle wheel 38 which is coupled to the not illustrated pinion.

If desired, an additional arresting mechanism can be provided at the mounting structure 30 for securing the position of tool PT in any desired position along the extension of posts 32, 34. It will be noted that this mounting structure 30 allows a drill bit (tool element TE) of the power drill PT to be moved up and down and through central window 18 of support structure 14 to be brought into and out of engagement with a work piece PWP or CWP (as per FIG. 7) to effect machining of the work piece. It will be equally appreciated that it is possible to exchange tool mounting bracket (plate) 36 with other types of mounts which are adapted to the specific geometry/shape of that part of the housing of the power tool by way of which the tool is secured to the two uprights 32, 43 of the gantry-type tool mounting arrangement 30.

In use, in order to secure base 10 onto a work piece, clamping handles 74 are loosened such that magnet units 12 are free to rotate about their respective swivel axes SA. Due to the non-centric location of swivel axis SA with respect to the centre of gravity of units 12, due to threaded bores 64 at mounting plates 54 being located near an upper corner of the terminal end faces 44 of units 12, the units 12 will tend to rotate into a rotational position off-set from one in which the pole shoes 48 locate in a common plane, into a position similar to the one shown in FIG. 6, ie a position in which the working faces 46 of units 12 are angled with respect to a common plane, whereby guiding bolts 66 and guiding pins 68 will come to rest near or at the bottom of arched slot 72. This is not problematic given that base 10 can then be placed onto a flat work piece and the units 12 rotated (using handles 74) into the correct attitudinal position so that all pole extension rails 48 come to rest in parallel on the flat surface of the work piece as shown in FIG. 7a. If the base is to be placed onto a curved work piece, (re-)orientation of the pole rails carrying working face 46 of units 12 can be easily adjusted to ensure both rails of each unit 12 make adequate contact with the curved work piece surface (as per FIG. 7b). In either case, once so placed on a work piece, magnet units 12 can be turned into their magnetically attractive 'ON' state' by appropriate manipulation of magnet unit switching handle 52, which will close the external magnetic circuit between units 12 and the work piece, thereby magnetically securing base 10 to work piece PWP or CWP. The operator can then secure the rotational position of units 12 at support structure 14 by tightening the arresting handles 14 against the side legs of support structure 14.

Figure 8:
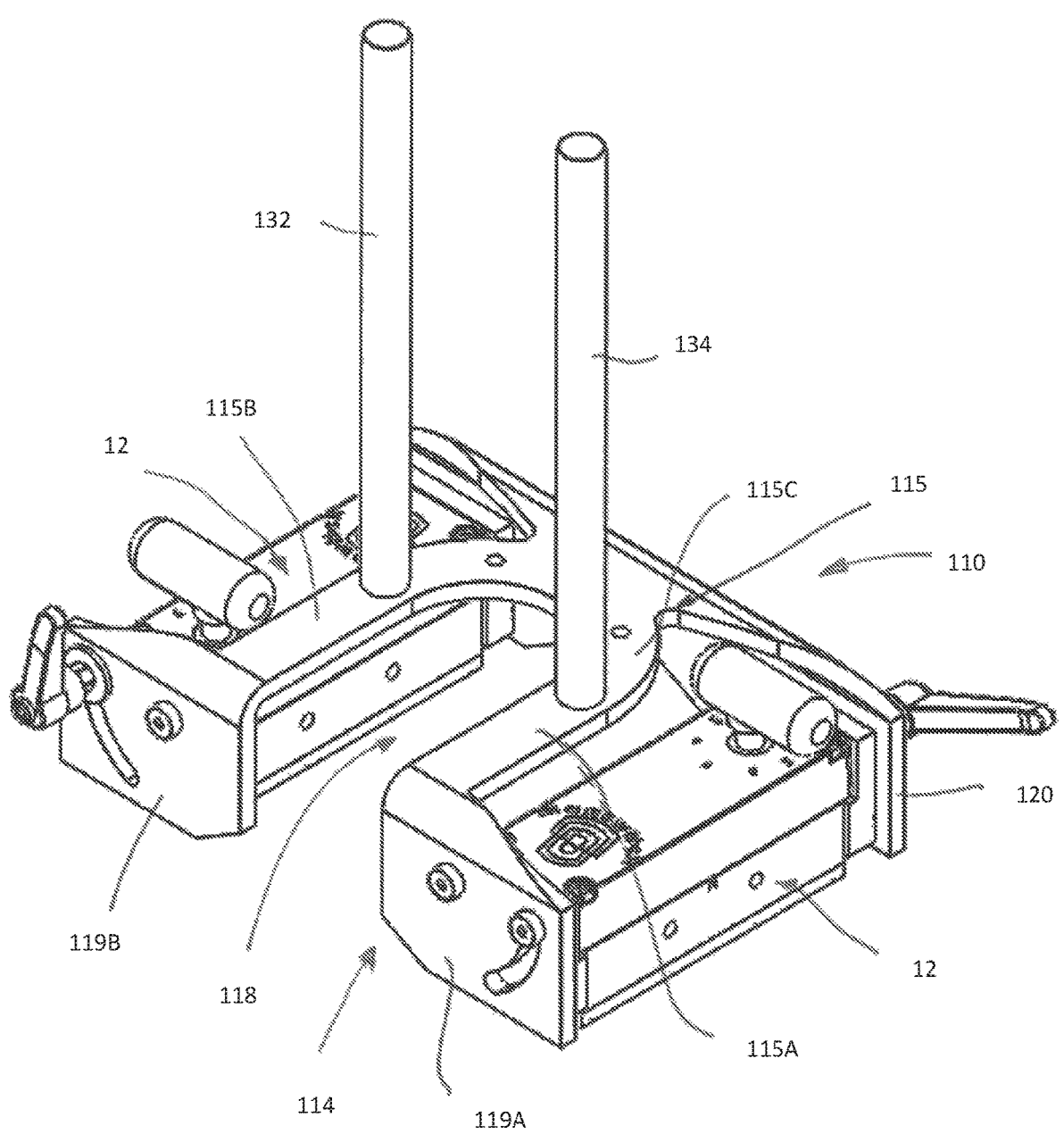
FIG. 8 is an isometric view of a second embodiment of a magnetic base in accordance with the present invention.
Figure 9:
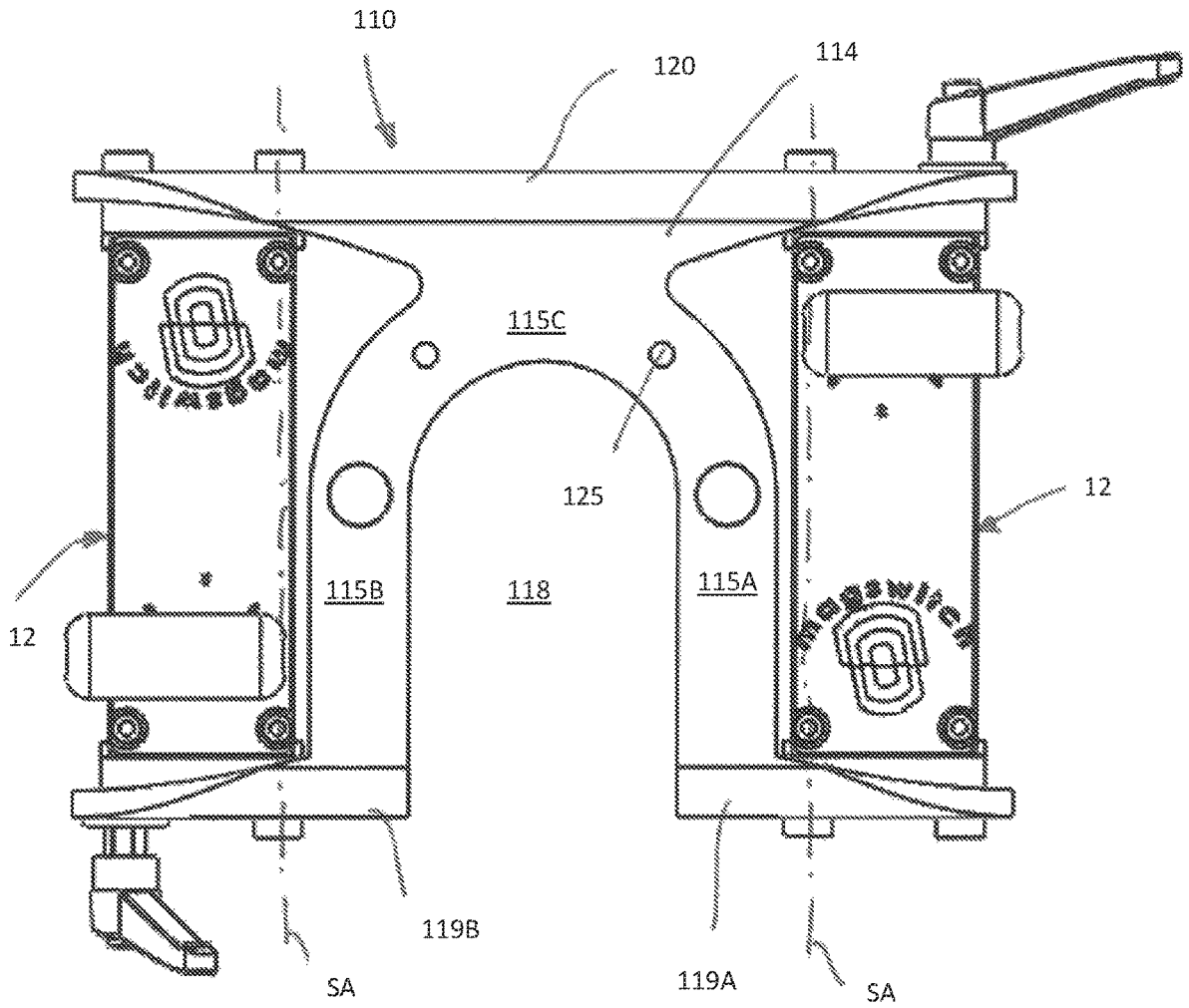
FIG. 9 is a top plan view of the magnetic base of FIG. 8.

FIGS. 8 and 9 show a further embodiment of the present invention. The essential difference between base 10 illustrated in FIGS. 1 to 7 and base 110 illustrated in FIGS. 8 and 9 resides in the configuration of the support structure 114. Consequently, only the relevant differences will be described below, and the reader should refer to the previous embodiment for additional details.

Support structure 114 comprises a top plate 115 which is generally U-shaped in top plan view, rather than annular as shown in FIG. 1. That is, rather than having a central circular window, top plate 115 will define a u-shaped cut-out 118 that extends from one edge of plate 115 between parallel plate portions (legs) 115a and 115b and terminates at an about central location bordered by arc portion 115c joining parallel plate portions 115a and 115b. Consequently also, leg plate 19 as illustrated in FIGS. 1-7 is replaced by two leg plates 119a and 119b which are integrally formed in extension of the parallel plate portions 115a and 115b and angled perpendicular to these, respectively. The other leg plate 120 is of same configuration as was described in relation to FIGS. 1-7. In essence, a three legged support structure 114 is provided in which the central cut-out 118 bisects and replaces a central web portion of leg plate 19 of the structure of FIG. 1.

With this type of support structure 114 it is possible to use two upright tool mounting poles 132, 134 to mount and secure to base 110 a power tool having a work piece engagement element whose dimensions are larger than the diameter of window 18, eg a circular saw blade of a circular saw power tool (not illustrated) that can be mounted for plunger-like displacement along upright poles 132, 134, and whose diameter is such that it would be impeded by the presence of a continuous web extending between leg parts 119*a* and 119*b*.

Figure 10:
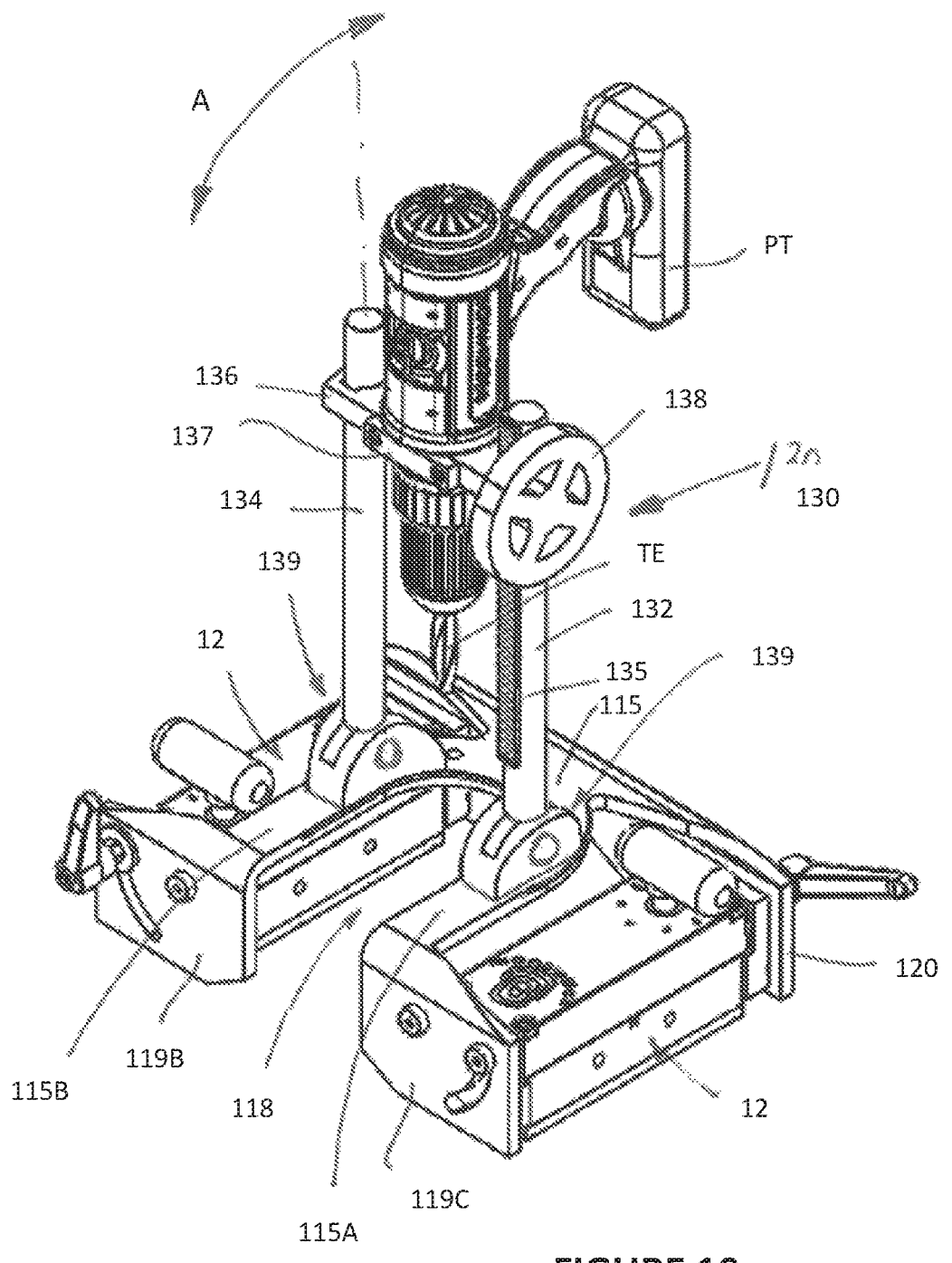
FIG. 10 is an isometric view of a third embodiment of a magnetic base in accordance with the present invention, with a second embodiment of a power tool mounting structure secured to the base and a hand held power drill mounted at the mounting structure.

FIG. 10 illustrates a magnetic base 110 essentially as described with reference to FIGS. 8 and 9, wherein in contrast with the illustration of those figures, the tool mounting structure 130, whilst otherwise identical to the one illustrated in FIG. 6, comprises respective swivel mounts 139 into which the lower terminal ends of upright posts 132, 134 are secured. That is, swivel mounts 139 are secured to top plate 115 using the mounting holes 125 at each leg portion 115*a*, 115*b* into which the terminal ends of posts 132, 134 would normally be received. The swivel mounts 139 permit posts 132, 134 to be inclined with respect to the vertical (perpendicular to the plane of top plate 115) to permit the tool engagement portion TE of the power tool PT to be swivelled out of the vertical into a desired inclined orientation along swivel path A to effect non-vertical machining operations on a work piece.

FIGS. 11*a* to 11*d* illustrate a further (fourth) embodiment of a magnetic tool support base 210 in accordance with the present invention. Whilst similar to the previously described first embodiment, the mounts at the support structure, which in the former embodiment provided a single degree of freedom of rotation of the magnet units 12, are modified to provide one (additional) degree of freedom of translatory movement of the units 12 towards and away from one another along a rectilinear path TA (translator axis) as per arrows A in FIG. 11*d*.

Figures 11A, 11B:
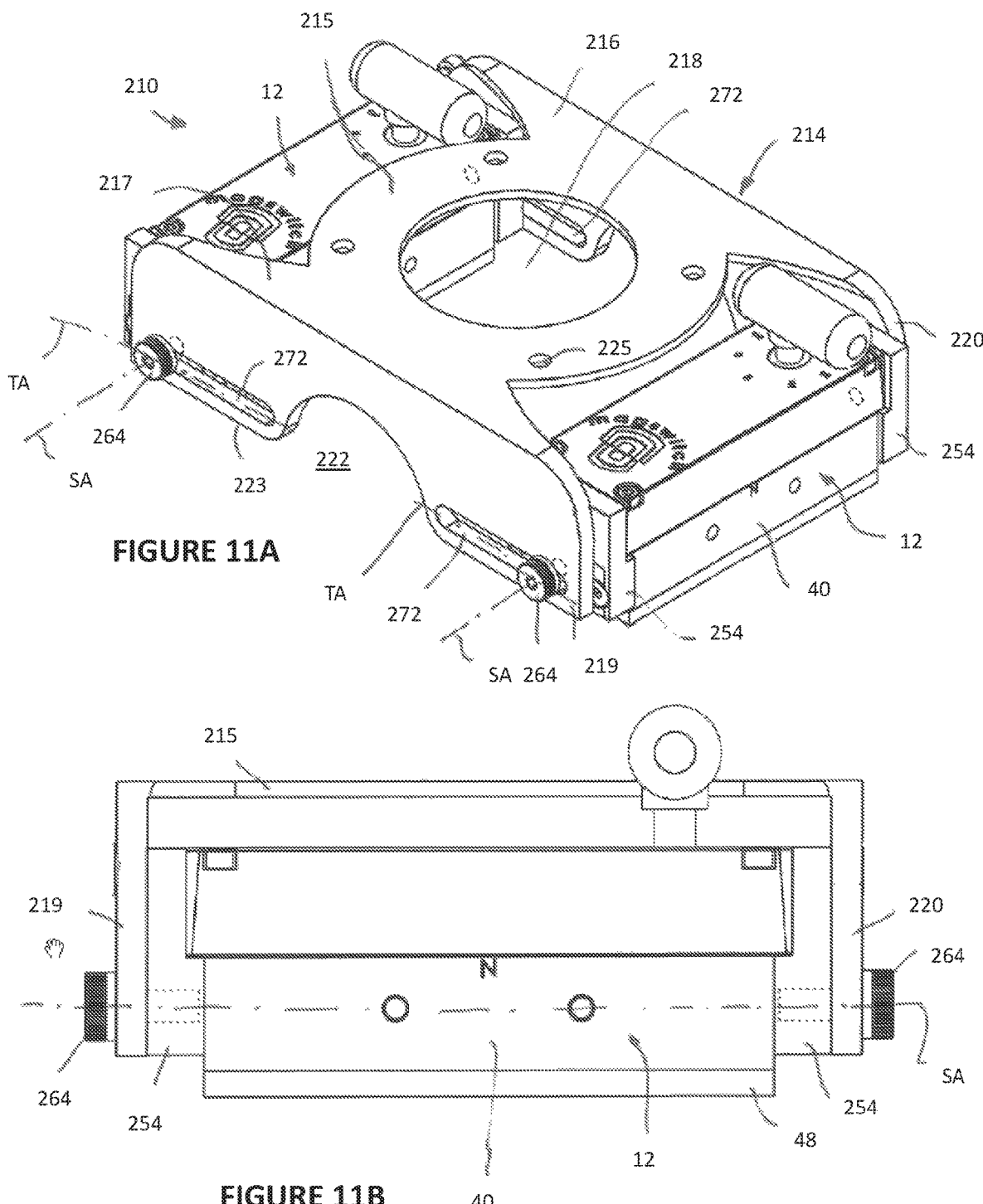
FIGS. 11a to 11d are, respectively, an isometric, a side plan, a front plan and a top plan view of a fourth embodiment of a magnetic base in accordance with the present invention.
Figures 11C, 11D:
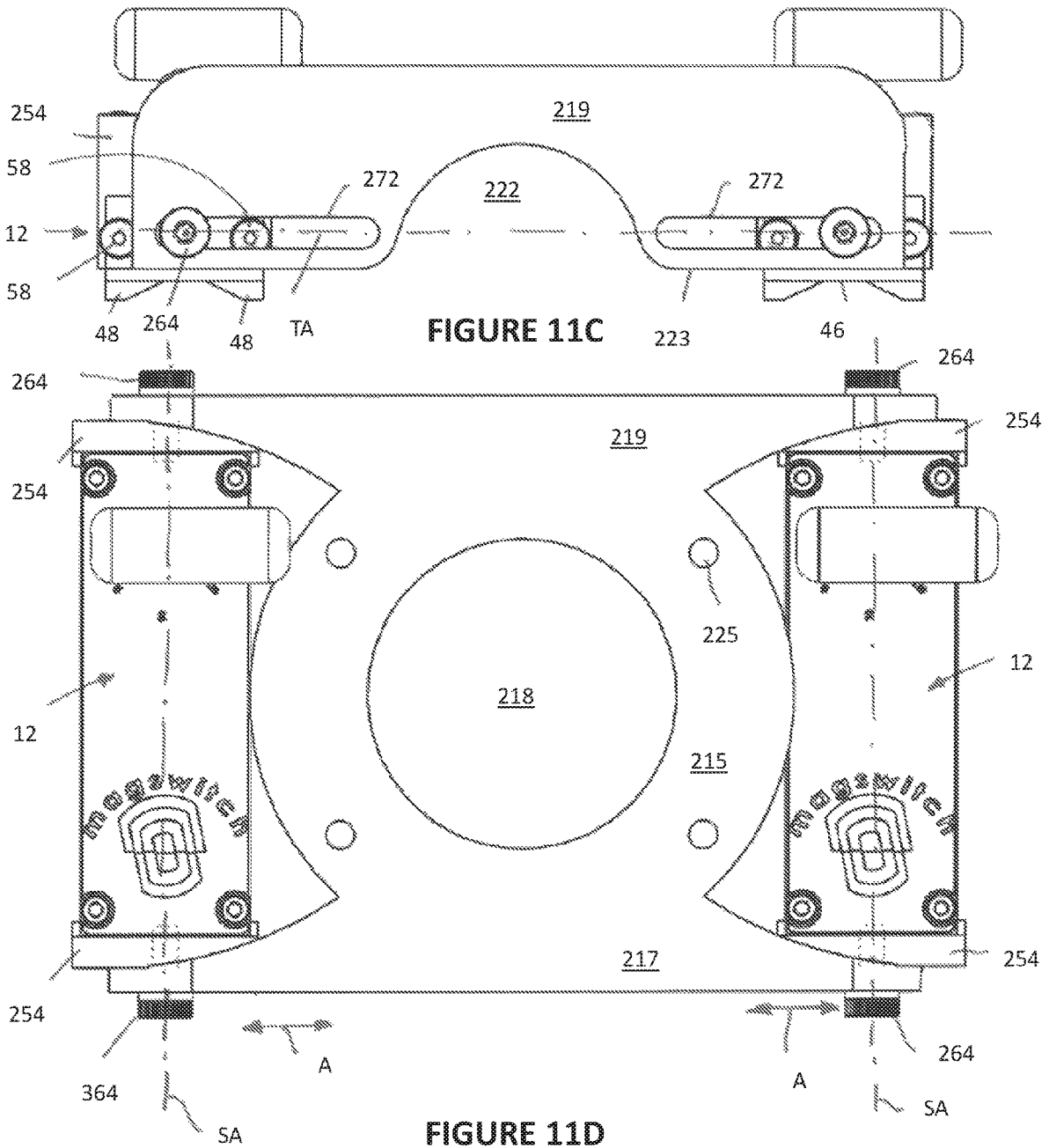

Support structure 214 is again a single-piece cast body of non-magnetic metal (or alloy), with an annular top plate 215 having a central circular window 218. Annular top plate 215 extends into triangular web portions 216 and 217 at diametrically opposite ends which are co-planar with top plate 215. A pair of parallel leg plates 219 and 220 extend perpendicular to top plate 215 at the width-ward edges of triangular web portions 216, 217, so that in cross-section a more 'edgy' u-shaped configuration (as seen in FIG. 11*b*) is provided when compared with the first embodiment (as seen in FIG. 3).

In this embodiment again, two magnet units 12 as described above are supported and secured between the facing parallel leg plates 219, 220. However, the mount is different to the one previously described.

Mounting plates 254 secured to the axial end faces of the housing (40) of magnet units 12 are of similar overall configuration to the ones illustrated in FIG. 5, but for the presence of a single threaded bore 162 (instead of two) which is located centrally between the counter sunk bores in which are received the shoulder bolts 58 which secure the mounting plates 254 to the housing 40; in the embodiment of FIGS. 1-10, two threaded bores at located at each upper corner of mounting plate 58.

Two mirror symmetric, straight guiding and mounting slots 272 are provided on either side of the curved incision 222 in the lower edge 223 of each leg plate 219, 220, extending parallel to said edge 223. Thus, slots 272 replace the four co-axial through holes 70 of the embodiment of FIGS. 1 to 10. Axle shoulder bolts 264, whose shafts have a diameter to provide a slide-fit when received within slots 272, extend through each slot 272 and screw into the threaded bore 162 present at each mounting plate 254 in order to support magnet units 12 between the leg plates 219 and 220 of support structure 214 in a manner that allows both rotation of each unit 12 about swivel axis SA defined between the two coaxially extending axle shoulder bolts 264 at each unit 12 and translatory movement along guiding slots 272. It will be appreciated that the guiding and mounting slots 272 may also be oriented with a smaller or larger degree of inclination with respect to the plane which is spanned by the lower edges 223 of leg plates 219 and 220, which will then allow the working face 46 (and consequently the two pole extension rails 48) of the two magnet units 12 to be adjusted up and down in relation to the lower (standing) edge 223 of leg plates 219, 220 by moving the units 12 along the guided path provided by the slots 272.

Rather than providing a separate clamping and/or arresting mechanism by way of which either one or both the translatory and the rotational degree of freedom of movement of each unit 12 at support structure 214 may be arrested and set, it is preferred to have one set of axle shoulder bolts 264 at one leg plate 219 secured with their bolt heads maintaining a small clearance gap to the facing surface of the leg plate, while providing either the other set of axle shoulder bolts 264 at the other leg plate 220 with an intervening clamping washer between bolt head and leg plate 220, which can be frictionally engaged/disengaged between bolt head and leg plate surface by tightening or loosening shoulder bolts 264 in their mounting bores at mounting plate 254 of magnet unit housing 40, or ensure that the length of the shoulder bolt is selected such as to allow tightening of it with its head against the facing side of leg plate 220 directly.

It will be appreciated that a tool mounting structure such as illustrated in FIG. 6 may be mounted to top plate 215 as was described previously.

The magnetic tool base embodiment of FIG. 11 has an arrangement/lay-out of guiding and mounting slots 272 in which are received the shoulder bolts 264 that secure the magnet units 12 at the support structure 214 that enables the same magnet base 210 to be used to magnetically secure and support a tool at cylindrical work pieces of varying diameters, the length of the slots providing a primary diameter adjustment range, whereas the engagement angle of the magnet units against a curved surface of a tubular or cylindrical work piece will be primarily a function of spacing and cross-section of the pole shoes at the working face of the magnet units as these come into engagement with said surface as consequence of rotation of the units about their respective swivel axes provided by the shoulder bolts 264 being secured to the magnet unit's housing.

Figure 12A:
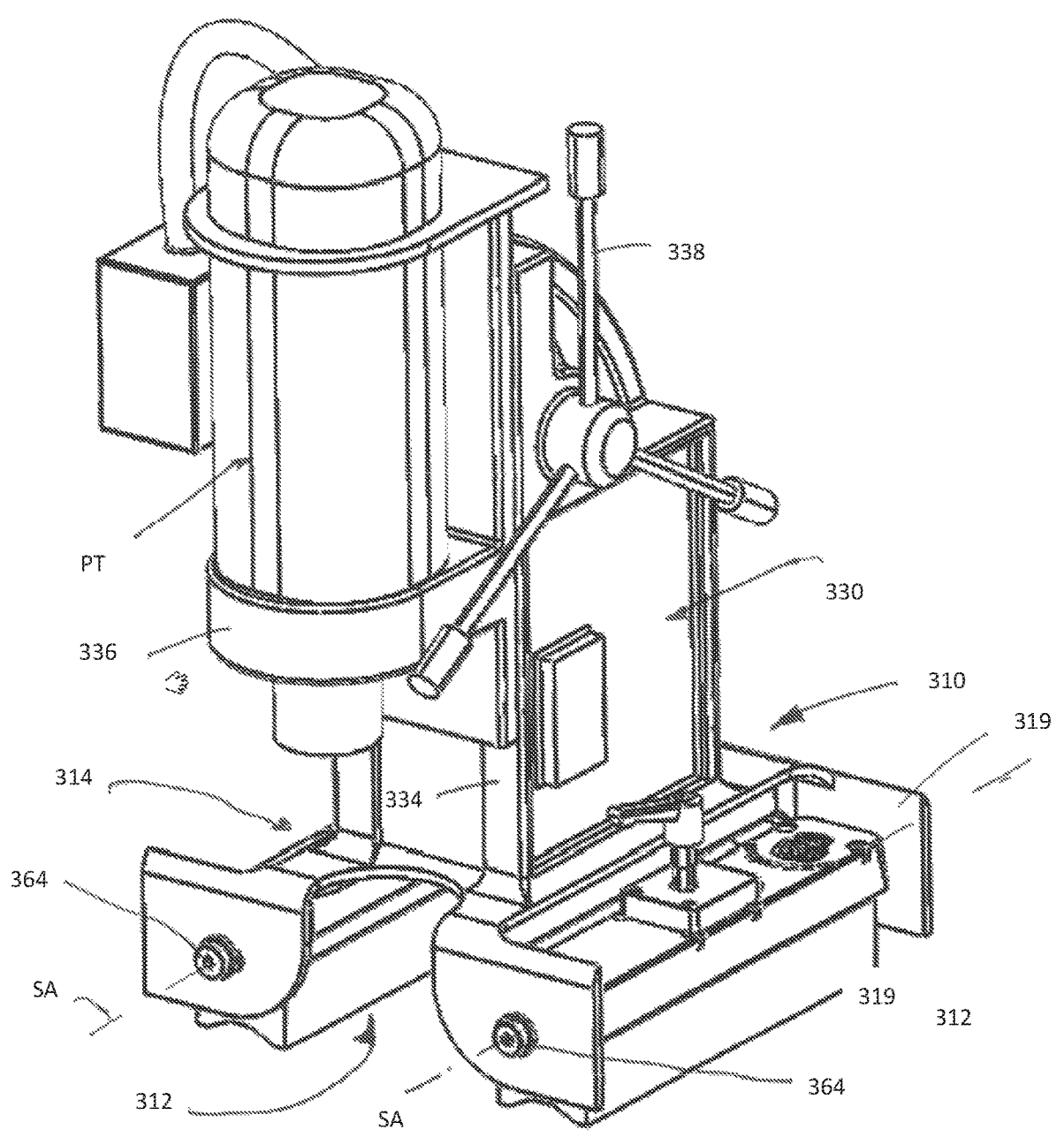
FIGS. 12a and 12b are, respectively, isometric views from (a) slightly above and slightly to the side and (b) slightly below and slightly to the side of a fifth embodiment of the invention, a plunger drill tool with magnetic stand in accordance with the present invention.
Figure 12B:
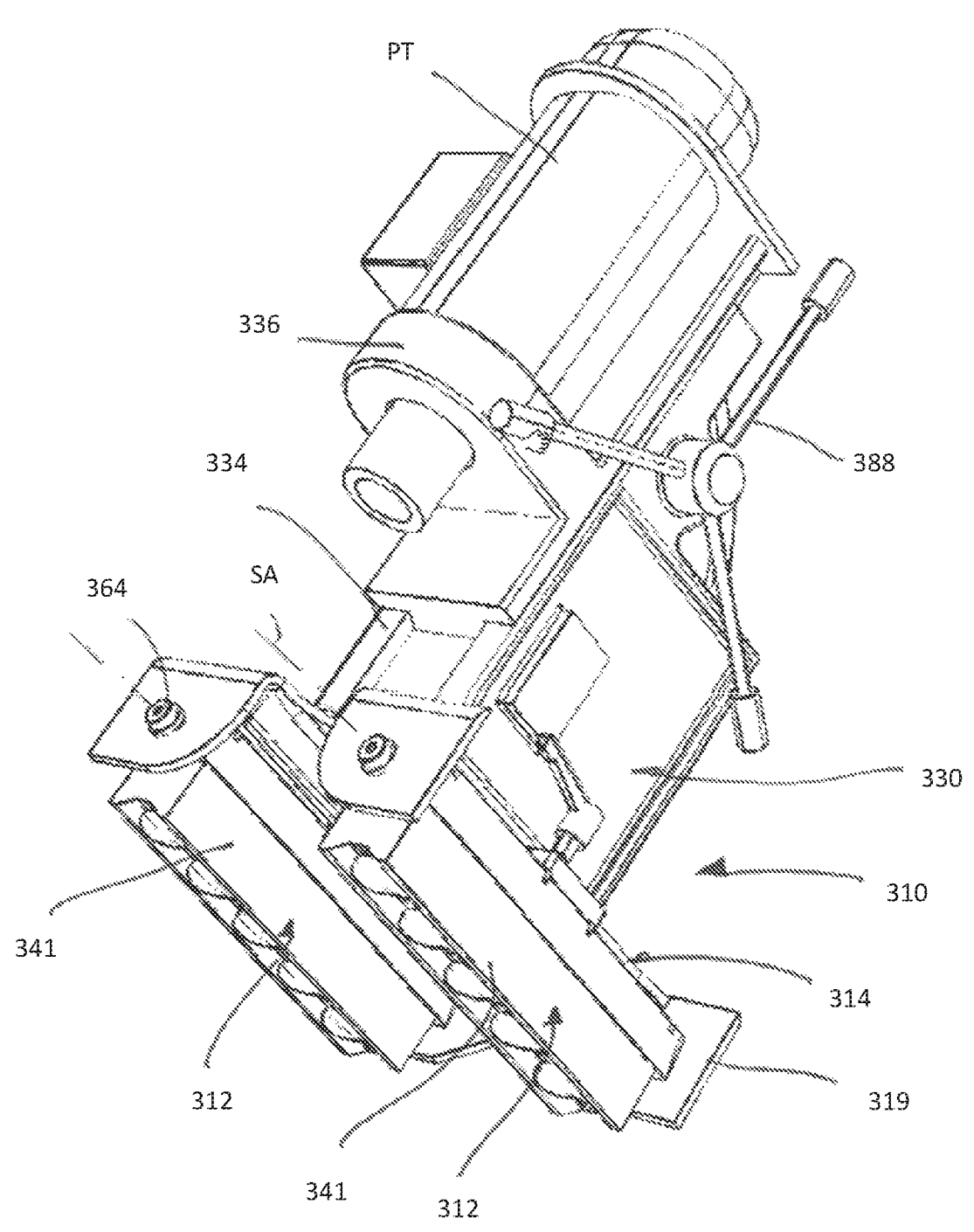
Figure 13:
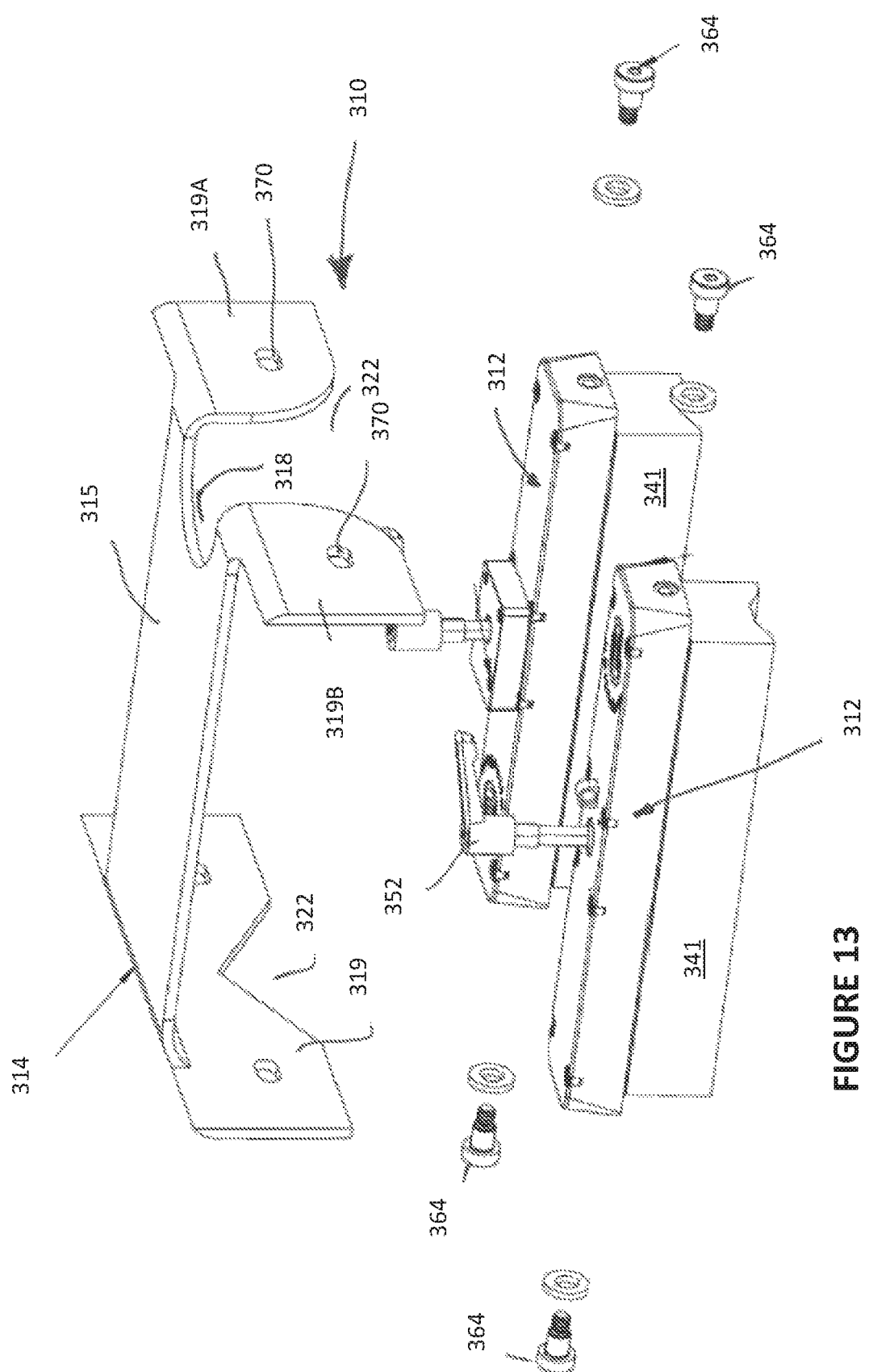
FIG. 13 is an exploded perspective view of the support plate and the two on-off switchable magnet units of the drill tool shown in FIG. 12 (without the other components)

FIGS. 12*a*, 12*b* and 13 show yet a further, fifth embodiment of the present invention. The relevant differences to the closest previously described embodiment, namely the 2$^{nd}$ one described with reference to FIG. 8, will be explained in the following. The reader should refer to the description of the previous embodiments for additional details.

Firstly, the magnet units 312 are MLAY 1000×5 type, which while similar to the MLAY 1000×3 units 12, instead have five pairs of stacked, diametrically polarised cylindrical permanent magnets, each pair received within a respective, upright cylindrical cavity within the lower housing part 341, as perhaps best seen in FIG. 12*b*. These units provide increased magnetic flux and thus holding force when in the on position.

Next it will be noted that the magnetic base 310 is comprised of support structure 314 and a tool carrying pedestal unit 339 welded on an upper face of the former.

Support structure 314 is made from a steel sheet metal piece having adequate gauge to carry the operational loads and weights of the tool (PT), pattern cut and bent into shape as best shown in FIG. 13. Whilst superficially similar to support structure 114 of FIG. 8/9, it is composed of a central top plate portion 315 of about rectangular foot print and on an upper face of which the pedestal unit 339 is supported and fixed by welding. A t-like extension web 319 at one (length-wise) end thereof is bent downward to provide one of the stand legs of the structure; a triangular cut out 322 being present centrally at the lower terminal edge of upright web/leg portion 319. On the opposite lengthwise end of top plate portion 315, a semi-circular cut-out 318 which extends only a small distance into plate portion 315, and which comprises a flared portion 322', causes the otherwise t-like web which is bent downwards to provide two vertical web legs 319a and 319b, very much as previously described with reference to FIGS. 8 and 9 (but for the extent by which cut-out 318 extends into plate portion 315).

It can be further noted that in comparison with the embodiment of FIG. 8, the mounting holes 370 which serve to allow passage of mounting/swivel axis bolts 364 to support the magnet units 312 at the base structure 310 with a single degree of rotational movement about swivel axis SA, are slightly elongate (and not circular) in traverse direction parallel to the plane of top plate portion 315. This enables some translational adjustment of the spacing between the two magnet units 312 to and away from one another.

Furthermore, rather than having a separate pair of guiding slots, (see FIG. 5, reference number 72), and swivel-motion arresting/clamping handles, swivel axis bolts 364 perform the dual function of defining the swivel axle as well as the swivel motion arresting fasteners to fix a desired rotational attitude of magnet units 312 at support structure 310.

As previously stated, box-like pedestal tower 330 is welded onto the top face of top plate portion 315 and comprises a pair of integral (or separately attached) vertical guide rails 334 at which is guided a tool carriage 336 which mounts in known fashion the motor of a plunger drill tool illustrated schematically at PT. Three-armed handle 338 cooperating with a rack and pinion (or other) drive train serves to move tool carriage 336 up and down with respect to top plate portion 315 (and thus support structure 314), thereby allowing an operator to bring a non-illustrated machining bit carried at a chuck coupled to the spindle of the tool motor in and out of controlled engagement with a work piece on which the magnetic base 310 can be placed and secured.

It will be noted that while the cut-out 318 does not extend into the central area of top plate portion 315, and thus tool PT is off-centre with respect to support platform 315, pedestal 330 can be weighted such as to minimise ex-centric loads that may otherwise tend to pray-off the magnetic attachment of magnet units 312 at the ferromagnetic work piece to be machined by the tool.

Figure 14:
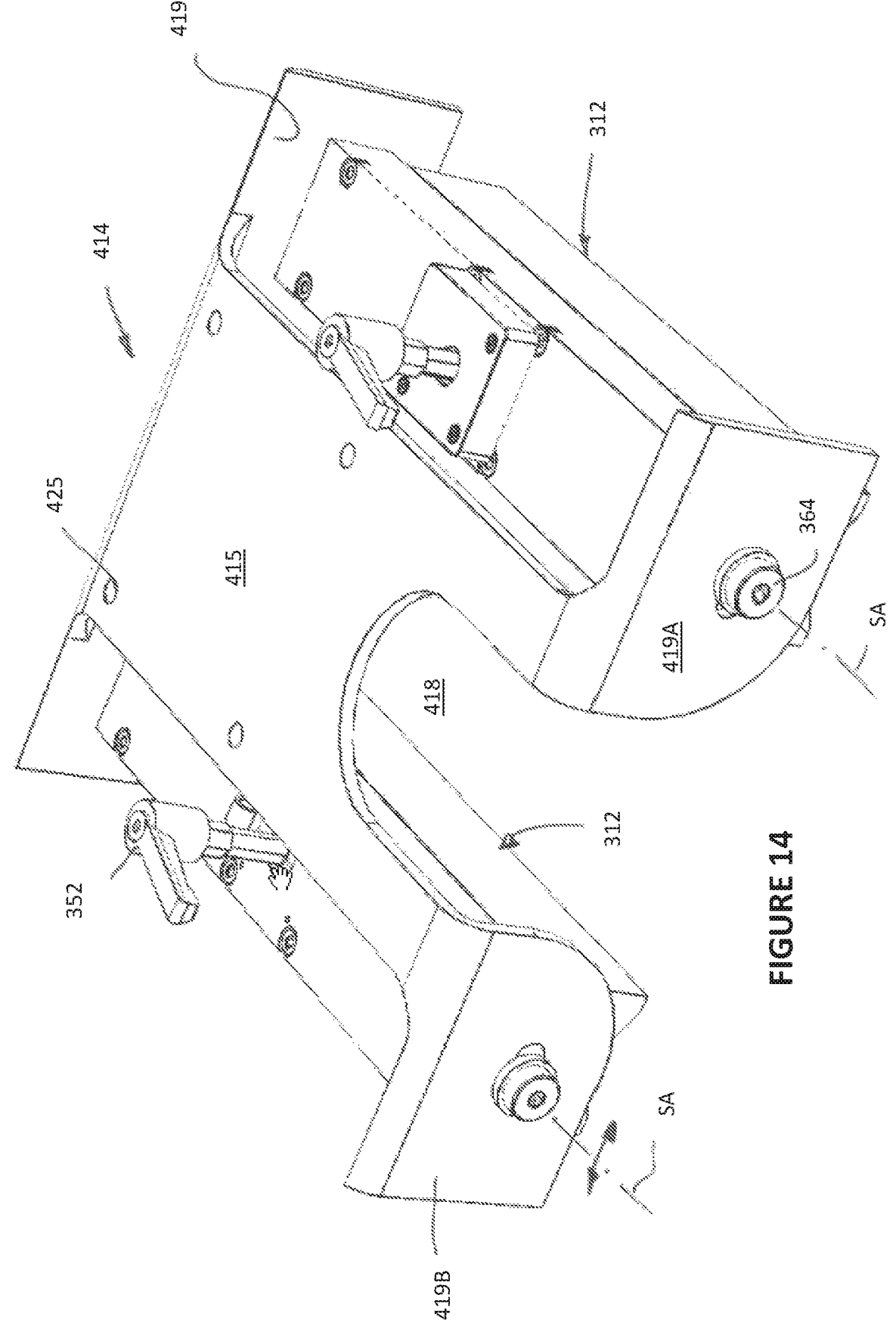
FIG. 14 is an isometric view similar to FIG. 11 a of a sixth embodiment of a magnetic base in accordance with the present invention.

Finally, FIGS. 13 and 14 show a further (sixth) embodiment of the present invention. The sole difference to the fifth embodiment illustrated in FIGS. 12a and 12b resides in (a) the absence of a tool mount that is integral with top plate 315, (b) the configuration and size of the cut out 418 in the top plate 415 of integral support structure 414 and (c) presence of four mounting holes 425 by way of which different types of non-illustrated tool mounting structures can be mounted and fastened to the magnetic base 410 in readily exchangeable fashion, similar to the stand embodiment of FIGS. 8 and 9. The reader should thus refer to the previous embodiments for additional details.

It will be appreciated from the afore provided descriptions of different embodiments of the invention, that variations of the basic concept of the invention can be implemented by combining different features mentioned in connection with the different embodiments.

The invention claimed is:

1. A magnetic tool stand combination comprising:
   a tool; and
   a magnetic tool stand for supporting and securing the tool relative to a ferromagnetic body, the magnetic tool stand comprising:
   (a) first and second on-off switchable magnet units, each of the first and second on-off switchable magnet units having at least one pair of oppositely polaris-able pole shoes at a working face of the respective on-off switchable magnet unit, the pole shoes disposed to provide a closed magnetic circuit at each unit with and when contacting the ferromagnetic body and to magnetically attach the magnetic tool stand to the ferromagnetic body and each of the first and second on-off switchable magnet units having a handle to effect manual switching of the respective on-off switchable magnet unit into one of an active magnetic state and a deactivated magnetic state;
   (b) a support having (i) a first side on which is provided a tool mount for releasable or permanent securing of the tool to the support, and (ii) a second side opposite the first side and which, in use of the magnetic tool stand, faces a ferromagnetic body on which the magnetic tool stand is to be secured, the support comprises a horizontally extending top and at least one pair of legs extending downward from the horizontally extending top and spaced apart from one another, the first and second on-off switchable magnet units located and supported between the at least one pair of legs, the handle of the first on-off switchable magnet unit extending above the first side of the support; and
   (c) first and second mounts releasably securing the first and second on-off switchable magnet units, respectively, to the support, the first and second mounts located in spaced apart relationship to each other, the first and second mounts devised to provide at least one degree of freedom of rotational movement for the respective on-off switchable magnet units at the support and enable the working faces to be rotated into a range of operational positions including a first position in which the working faces of the first and second on-off switchable magnet units are coplanar or parallel for resting the pole shoe pairs on at least one planar surface of the ferromagnetic body, and a second position in which the working faces of the first and second on-off switchable magnet units are angled relative to each other for resting the pole shoe pairs of both the first and second on-off switchable magnet units on a curved surface of the ferromagnetic body, wherein the tool is a rotary power tool mounted to or integrated with the support.

2. The magnetic tool stand combination of claim 1, wherein a window in the support extends between the first and second sides and is located between the first and second on-off switchable magnet units, the window sized to allow a work piece interaction component of the tool to interact with the ferromagnetic body or a work piece located proxi-mate the second side.

3. The magnetic tool stand combination of claim 1, wherein a cut-out extends between the first and second sides at an edge of the support and is located between the first and second on-off switchable magnet units, the cut out sized to allow a work piece interaction component of the tool to interact with the ferromagnetic body or a work piece located proximate the second side.

4. The magnetic tool stand combination of claim 1, wherein the first and second on-off switchable magnet units are secured to the support and are rotatable about a respective swivel axis relative to the support.

5. The magnetic tool stand combination of claim 1, wherein at least one of the first and second mounts is further devised to additionally allow relative translatory displacement of the first and second on-off switchable magnet units towards and away from each other whilst secured at the support.

6. The magnetic tool stand combination of claim 5, wherein the translatory displacement is rectilinear, curved, or both.

7. The magnetic tool stand combination of claim 3, wherein the first and second on-off switchable magnet units are located and supported between the at least one pair of legs on either side of the cut out.

8. The magnetic tool stand combination of claim 5, wherein each of the first and second mounts comprises (a) a pair of slots, one slot in each opposing leg of the at least one pair of legs and (b) a pair of support bolts or pins secured at axially opposite end faces of the respective on-off switchable magnet unit and received within said congruent slots in a manner allowing (i) rotation of the respective magnet unit about a swivel axis extending between the support bolts or pins received in the slots and (ii) translatory displacement along said slots.

9. The magnetic tool stand combination of claim 1, wherein each of the first and second mounts comprises (a) a pair of through holes located coaxially in each opposing leg of the at least one pair of legs and (b) a pair of support bolts or pins secured at axially opposite end faces of the respective on-off switchable magnet unit and received within said through holes in a manner allowing rotation of the respective on-off switchable magnet unit about a swivel axis defined by the pair of coaxially aligned through holes.

10. The magnetic tool stand combination of claim 1, wherein each of the first and second mounts further comprises (a) a pair of curved slots in each opposing leg of the at least one pair of legs, the curved slots having as their respective center of curvature at a swivel axis of the respective on-off switchable magnet unit, and (b) a pair of follower pins or bolts secured at the axially opposite end faces of each respective on-off switchable magnet unit and received in said curved slots for rotation of the respective on-off switchable magnet unit about its swivel axis.

11. The magnetic tool stand combination of claim 1, wherein the first and second on-off switchable magnet units each comprise an external housing and wherein the pole shoes are provided by a pair of ferromagnetic pole rails which extend substantially along an axial length of the external housing in spaced apart relationship on the working face provided at one side of the external housing.

12. The magnetic tool stand combination of claim 7, wherein the horizontally extending top of the support is U-shaped and the cut-out is located between a pair of first web portions joined by a traverse web portion extending between the pair of first web portions, and wherein the at least one pair of legs comprise (i) a pair of first terminal webs extending perpendicular to and at the terminal ends of said pair of first web portions of the U-shaped horizontally extending top, and (ii) a second terminal web extending perpendicular to and located at a terminal end of the traverse web portion, wherein the pair of first terminal webs and the second terminal web extend in parallel spaced apart relationship, each said first and second on-off switchable magnet unit are supported at the second terminal web portion and one of said first terminal webs, respectively.

13. The magnetic tool stand combination of claim 1, further comprising an arrester operative between the first and second on-off switchable magnet units and the support to releasably secure the magnet units against movement when in said operational positions.

14. The magnetic tool stand combination of claim 13, wherein the arrester includes a clamp operable by a handle.

15. The magnetic tool stand combination of claim 1, wherein the first and second on-off switchable magnet units are permanent magnet units switchable between the on state in which magnetic flux passes between the respective first and second on-off switchable magnet unit through the pole shoes into the ferromagnetic body, and the off state in which no magnetic flux is present at the pole shoes of the respective first and second on-off switchable magnet unit.

16. The magnetic tool stand combination of claim 3, wherein the first and second on-off switchable magnet units are located and supported between the at least one pair of legs on either side of the cut-out.

17. The magnetic tool stand combination of claim 3, wherein the tool mount extends away from said first side of the support.

18. The magnetic tool stand combination of claim 17, wherein said tool mount allows fixing a defined position at said side supports.

19. The magnetic tool stand combination of claim 1, wherein the first and second mounts are configured to releasably secure the first and second on-off switchable magnet units in any of a plurality of operation positions including the first position and the second position.

20. The magnetic tool stand combination of claim 1, wherein the handle of the first on-off switchable magnet unit is positioned between the at least one pair of legs.

21. A combination comprising:
a rotary power tool; and
a magnetic base for securing the rotary power tool to a ferromagnetic body, comprising:
first and second magnet units each having a working face by way of which each magnet unit is capable of resting on and is magnetically attachable in releasable manner to the ferromagnetic body when in contact therewith;
a support carrying the first and second magnet units and including a tool mount adapted to secure the rotary power tool to the support, wherein the support has an opening through which a work piece engagement or measuring implement may extend from a first side of the support to a second side of the support; and
first and second mounts releasably securing the first and second magnet units to the support; wherein the first and second magnet units are secured to the support in spaced apart relationship and rotatable about respective swivel axes enabling changing the orientation of the working faces of the respective first and second magnetic units relative to the support between a plurality of operational positions that include a first position in which the working faces of the first and second magnet units are generally in a common plane or parallel planes for resting on a flat surface of the ferromagnetic body, and a second position in which the working faces of the first and second magnet units are angled relative to each other for resting on a curved surface of the ferromagnetic body, wherein the support comprises at least one pair of legs extending parallel and spaced apart from one another, the first and second magnet units located and supported between the at least one pair of legs; wherein at least one of the first and second mounts is further devised to additionally allow relative translatory displacement of the first and second on-off switchable magnet units towards and away from each other whilst secured at the support.

22. A power tool system capable of being supported on and releasably fixed to a surface of a ferromagnetic body, the power tool system comprising:

a rotary power tool; and a stand, comprising a support at which a motor of the rotary power tool is supported or carried, the motor serving to impart motion onto a material cutting implement of the rotary power tool;

at least two on-off switchable magnet units for magnetically securing and fixing the rotary power tool in releasable manner on the ferromagnetic body, each on-off switchable magnet unit of the at least two on-off switchable magnet units having at least one pair of oppositely polarisable pole shoes at a working face of the unit that serve to stand the support on a surface of the ferromagnetic body and create a closed magnetic circuit with the ferromagnetic body in an on state of the on-off switchable magnet unit and switchable to an off state, each on-off switchable magnet unit of the at least two on-off switchable magnet units further comprising a handle to manually switch the respective on-off switchable magnet unit between the on state and the off state; and a plurality of mounts releasably securing the at least two on-off switchable magnet units to the support, the plurality of mounts releasably securing the at least two on-off switchable magnet units to the support, the plurality of mount located in spaced apart relationship at the support on opposite sides of an opening extending between an upper and a lower side of the support, each mount of the plurality of mounts devised to provide at least one degree of freedom of rotational movement about a swivel axis for the respective on-off switchable magnet unit secured at the support, whereby the pole shoe pairs of the at least two on-off switchable magnet units are rotatable into and securable at a plurality of operational positions including a first position in which the pole shoe pairs of the at least two on-off switchable magnet units are located in a common plane and may rest on a planar surface of the ferromagnetic body, and a second position in which the pole shoe pairs of the at least two on-off switchable magnet units are angled relative to each other and may rest on a curved surface of the ferromagnetic body; and fasteners for selectively and releasably fixing a selected one of the plurality of operational positions of each of the at least two magnet units at the support, wherein the support comprises at least one pair of legs extending parallel and spaced apart from one another, the at least two on-off switchable magnet units located and supported between the at least one pair of legs.

23. A combination comprising:

a rotary power tool; and a magnetic tool stand for supporting and securing the rotary power tool relative to a ferromagnetic body, comprising:

(a) first and second on-off switchable magnet units, each of the first and second on-off switchable magnet units having at least one pair of oppositely polarisable pole shoes at a working face of the respective on-off switchable magnet unit, each pair of the oppositely polarisable pole shoes disposed to provide a closed magnetic circuit at each respective on-off switchable magnet unit with and when contacting the ferromagnetic body and to magnetically attach the magnetic tool stand to the ferromagnetic body and each of the first and second on-off switchable magnet units having a handle to effect manual switching of the respective on-off switchable magnet unit into one of an active magnetic state and a deactivated magnetic state;

(b) a support having (i) a first side supporting the rotary power tool, and (ii) a second side opposite the first side and which, in use of the magnetic tool stand, faces the ferromagnetic body on which the magnetic tool stand is to be secured, the handle of the first on-off switchable magnet unit extending above the first side of the support; and (c) first and second mounts releasably securing the first and second on-off switchable magnet units, respectively, to the support, the first and second mounts located in spaced apart relationship to each other, the first and second mounts devised to provide at least one degree of freedom of rotational movement for the respective on-off switchable magnet unit at the support and to enable the working faces of the first and second on-off switchable magnet units to be rotated into a range of operational positions including a first position in which the working faces of the first and second on-off switchable magnet units are coplanar or parallel for resting the pole shoe pairs on at least one planar surface of the ferromagnetic body, and a second position in which the working faces of the first and second on-off switchable magnet units are angled relative to each other for resting the pole shoe pairs of both of the first and second on-off switchable magnet units on a curved surface of the ferromagnetic body, wherein the first and second on-off switchable magnet units are secured to the support and are respectively rotatable about a respective swivel axis.

24. A magnetic tool stand for supporting and securing a tool relative to a ferromagnetic body, comprising:

(a) first and second on-off switchable magnet units, each of the first and second on-off switchable magnet units having at least one pair of oppositely polarisable pole shoes at a working face of the respective on-off switchable magnet unit, the least one pair of oppositely pole shoes disposed to provide a closed magnetic circuit at each respective on-off switchable magnet unit with and when contacting the ferromagnetic body and to magnetically attach the magnetic tool stand to the ferromagnetic body;

(b) a support having (i) a first side on which is provided a tool mount adapted for releasable or permanent securing of the tool to the support, and (ii) a second side opposite the first side and which, in use of the magnetic tool stand, faces the ferromagnetic body on which the magnetic tool stand is to be secured; and (c) first and second mounts releasably securing the first and second on-off switchable magnet units, respectively, to the support, the first and second mounts are located in spaced apart relationship to each other, the first and second mounts devised to provide at least one degree of freedom of rotational movement for the respective on-off switchable magnet units at the support and enable the working faces to be rotated into a range of operational positions including a first position in which the working faces of the first and second on-off switchable magnet units are coplanar or parallel for resting the pole shoe pairs on at least one planar surface of the ferromagnetic body, and a second position in which the working faces of the first and second on-off switchable magnet units are angled relative to each other for resting the pole shoe pairs of both on-off switchable magnet units on a curved surface of the ferromagnetic body, wherein at least one of the first and second mounts is further devised to additionally allow relative translatory displacement of the first and second on-off switchable magnet units towards and away from each other whilst secured at the support and wherein each of the first and second mounts comprises (a) a pair of slots in the support, and (b) a pair of support bolts or pins secured at axially opposite end faces of the respective on-off switchable magnet unit and received within said pair of slots in a manner allowing (i) rotation of the respective on-off switchable magnet unit about a swivel axis extending between the support bolts or pins received in the pair of slots and (ii) translatory displacement along said pair of slots, wherein each of the respective on-off switchable magnet units includes a handle extending above the support in the first position of the respective on-off switchable magnet.

\* \* \* \* \*